(12) United States Patent
Hedges et al.

(10) Patent No.: US 11,504,923 B2
(45) Date of Patent: Nov. 22, 2022

(54) METHOD AND APPARATUS FOR ASSEMBLING A REINFORCEMENT WEB FOR USE IN A WIND TURBINE BLADE

(71) Applicant: Vestas Wind Systems A/S, Aarhus N. (DK)

(72) Inventors: Andrew Hedges, Surbiton (GB); Dennis Vigsø Jensen, Lemvig (DK)

(73) Assignee: Vestas Wind Systems A/S, Aarhus N (DK)

( * ) Notice: Subject to any disclaimer, the term of this patent is extended or adjusted under 35 U.S.C. 154(b) by 300 days.

(21) Appl. No.: 16/479,720

(22) PCT Filed: Jan. 16, 2018

(86) PCT No.: PCT/DK2018/050007
§ 371 (c)(1),
(2) Date: Jul. 22, 2019

(87) PCT Pub. No.: WO2018/137740
PCT Pub. Date: Aug. 2, 2018

(65) Prior Publication Data
US 2021/0276286 A1    Sep. 9, 2021

(30) Foreign Application Priority Data

Jan. 24, 2017   (DK) .......................... PA 2017 70046

(51) Int. Cl.
*B29C 70/44*    (2006.01)
*B29C 70/54*    (2006.01)
(Continued)

(52) U.S. Cl.
CPC .......... *B29C 70/446* (2013.01); *B29C 70/302* (2021.05); *B29C 70/443* (2013.01);
(Continued)

(58) Field of Classification Search
CPC ..... B29C 70/548; B29C 70/48; B29C 70/541; B29C 70/51; B29C 65/7841; B29D 99/0028
(Continued)

(56) References Cited

U.S. PATENT DOCUMENTS

| 3,087,207 A | 4/1963 | Styra |
| 2011/0085911 A1* | 4/2011 | Schroder ............... B29C 70/541 |
| | | 416/223 R |
| 2017/0320275 A1* | 11/2017 | De Waal Malefijt ....................... |
| | | B29D 99/0003 |

FOREIGN PATENT DOCUMENTS

| CN | 102039675 A | 5/2011 |
| CN | 202846762 U | 4/2013 |

(Continued)

OTHER PUBLICATIONS

"CNC Made Dovetail Box" Available Dec. 2016. <https://discuss.inventables.com/t/cnc-made-dovetail-box/31885/print> (Year: 2016).*
(Continued)

*Primary Examiner* — Matthew J Daniels
*Assistant Examiner* — Hana C Page
(74) *Attorney, Agent, or Firm* — Wood Herron & Evans LLP

(57) ABSTRACT

A method and apparatus (14) for assembling a reinforcement web (12) for use with a wind turbine blade (10) are provided. A pre-formed flange structure (20) to be integrated with laminate layers (58, 60) to form the reinforcement web (12) is clamped into position against a mould end surface (76) using one or more locating clamps (16). The locating clamps (16) include first and second clamp blocks (80, 82) that are shaped to provide an external profile that avoids resin collection and bridging during resin injection molding, while allowing for clamping to be applied to the flange structure (20) with an easily assembled and disassembled (Continued)

removable engagement of the clamp blocks (80, 82). The locating clamp (16) prevents undesirable dislodgment of the flange structure (20) during the assembly process for the reinforcement web (12), and without necessitating the use of complex or expensive molding equipment or processes.

12 Claims, 13 Drawing Sheets

(51) Int. Cl.
  *B29C 70/86* (2006.01)
  *B29C 70/30* (2006.01)
  *B29L 31/08* (2006.01)

(52) U.S. Cl.
  CPC ............ *B29C 70/541* (2013.01); *B29C 70/86* (2013.01); *B29L 2031/085* (2013.01)

(58) Field of Classification Search
  USPC ......................................................... 264/257
  See application file for complete search history.

(56) References Cited

FOREIGN PATENT DOCUMENTS

| | | | |
|---|---|---|---|
| CN | 106113528 A | 11/2016 | |
| DE | 102014018022 A1 | 6/2016 | |
| DK | 201570772 A1 | 12/2016 | |
| EP | 2213445 A1 | 8/2010 | |
| EP | 2308670 A1 | 4/2011 | |
| EP | 2604405 A1 | 6/2013 | |
| GB | 201507519 * | 6/2015 | ......... B29D 99/0003 |
| WO | 2013037466 A1 | 3/2013 | |
| WO | 2016066207 A1 | 5/2016 | |
| WO | 2016177375 A1 | 11/2016 | |

OTHER PUBLICATIONS

Rodriguez. "All About Dovetail Joints," Available Sep. 12, 2005. <https://www.finewoodworking.com/2005/09/12/all-about-dovetail-joints> (Year: 2005).*

China National Intellectual Property Administration, First Notification of Office Action in CN Application No. 201880015821.9, dated Dec. 17, 2020.

European Patent Office, International Seach Report and Written Opinion in PCT Application No. PCT/DK2018/050007, dated Mar. 21, 2018.

Danish Patent and Trademark Office, Search and Examination Report in PA 2017 70046, dated Jul. 6, 2017.

* cited by examiner

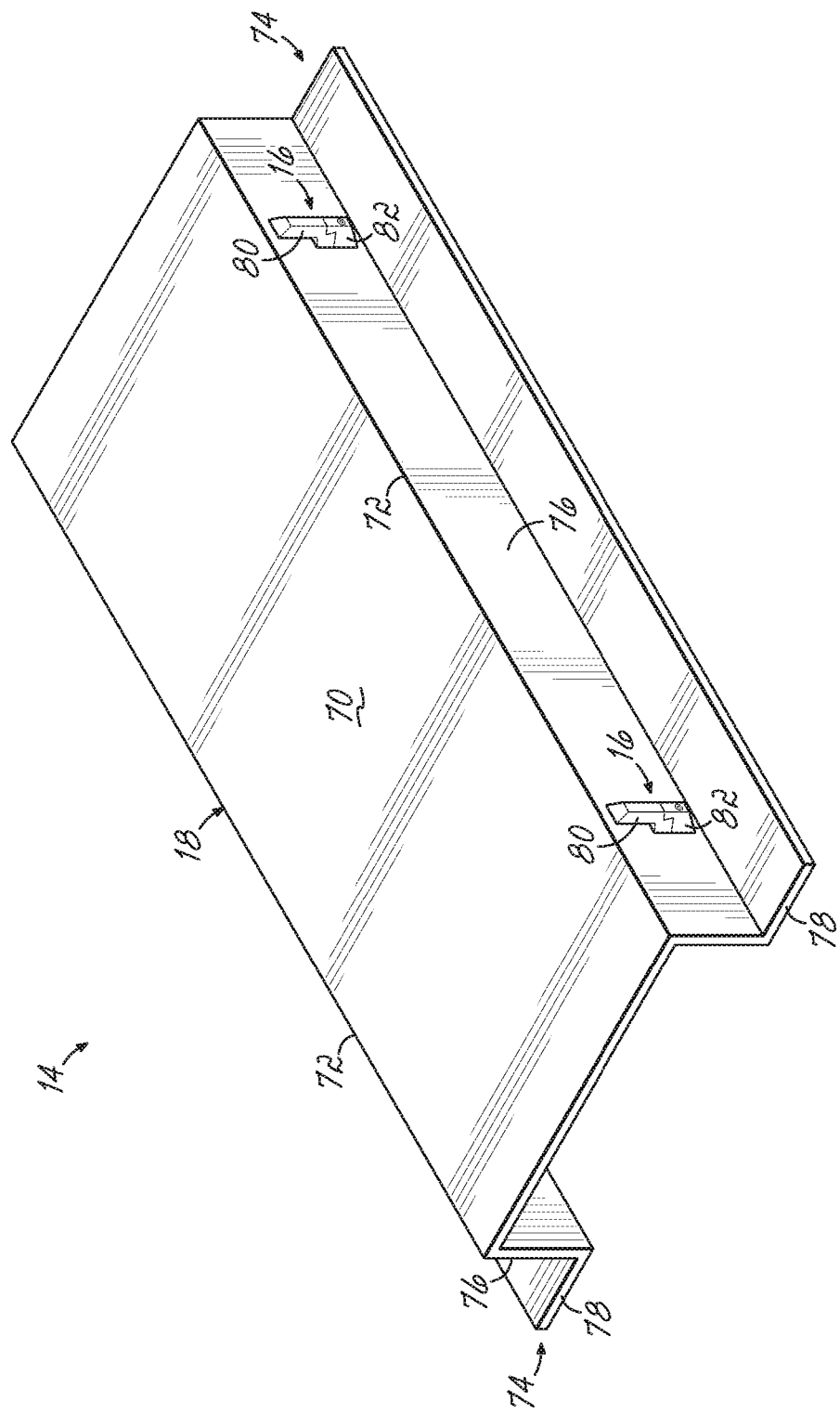

METHOD AND APPARATUS FOR ASSEMBLING A REINFORCEMENT WEB FOR USE IN A WIND TURBINE BLADE

TECHNICAL FIELD

The present invention relates generally to wind turbine blades, and more particularly, to manufacture and assembly of reinforcement webs used with wind turbine blades to reinforce an outer shell defining the aerodynamic profile of the blade.

BACKGROUND

Wind turbines are used to produce electrical energy using a renewable resource (wind energy in the ambient environment) and without combusting a fossil fuel. Generally, a wind turbine converts kinetic wind energy into mechanical energy and then subsequently converts the mechanical energy into electrical energy. A common type of wind turbine is the single rotor horizontal-axis wind turbine, although multi rotor wind turbines are also used frequently. As well understood, an exemplary single rotor wind turbine includes a tower defining a support structure, a nacelle located at the apex of the tower, and a rotor having a central rotor hub and one or more blades (e.g., three blades) mounted on the hub and extending radially therefrom. The rotor is supported by the nacelle and positioned at the front of the nacelle so that the rotor faces into the wind upstream of its supporting tower. The rotor may be coupled either directly or indirectly with a generator housed inside the nacelle and configured to convert the mechanical energy of the rotor to electrical energy.

As the wind turbine blades are the elements which capture the wind energy to produce mechanical energy in the form of rotor rotation, these elements must be manufactured to withstand significant loadings and stress, which can also highly vary over time during operation as well. Furthermore, especially in larger capacity wind turbines or wind turbines with only one rotor, the wind turbine blades often define highly elongated blade lengths to sweep through a sufficient area to capture the wind energy necessary to produce the higher amounts of electrical energy. Of course, the longer a wind turbine blade becomes, the more strength and stiffness needs to be provided in the construction or materials of the blade to withstand the associated loads from the wind. In this regard, one typical method of strengthening a wind turbine blade is to add one or more internal reinforcement webs, sometimes called shear webs, to be connected between first and second outer shell portions, which define the aerodynamic profile of the wind turbine after they are connected together. The internal reinforcement web(s) provide additional rigidity to the outer shell portions for the purposes of withstanding the erratic and high loading encountered during operation of the wind turbine.

Reinforcement webs for wind turbine blades typically include a central reinforcement wall (which may be generally planar or have multiple sections angled from one another) extending between the first and second outer shell portions and flanges located at opposite ends of the central reinforcement wall to connect to the first and second outer shell portions. The flanges typically define L-shaped or T-shaped structures at these opposite ends, and such elements can be difficult to produce in a similar manner at the outer shell portions (e.g., laying up composite layers in a mould). To this end, specialized molding equipment and processes have been developed to produce structural reinforcement webs with the necessary features.

For example, the reinforcement web may be conventionally constructed in one embodiment from a C-shaped panel and two L-shaped separate flanges which are bonded to the C-shaped panel to define an I-beam shape of the overall reinforcement web. The C-shaped panel is difficult in practice to manufacture in a mould because the external sidewalls of the mould (adjacent the ends of the C-shape) make it difficult to arrange the various composite layers needed to form the panel of the reinforcement web. Likewise, the generally sharp corners of the mould can result in wrinkles in the composite materials, which add weakness or potential failure points which can make the reinforcement web unusable. The separate coupling or bonding of the L-shaped separate flanges to the C-shaped panel adds costs such as additional manufacturing time when assembling a reinforcement web for a wind turbine blade.

Several conventional examples of molding equipment for making a C-shaped panel or a web are shown in German Patent Application Publication No. 10 2014 018 022 to Carbon Rotec; International Patent Application Publication No. WO 2013/037466 to Repower Systems; and International Patent Application Publication No. WO 2016/066207 to LM WP Patent Holdings. Each of these applications describes moulds that include a primary portion, where a central reinforcement wall of the web is assembled, and external mould side walls in spaced relation to the primary portion so as to define cavities for flanges of the web to be assembled (for example, see external plate 662 of the mould shown in FIG. 10 of the '207 Publication). These types of multi-part molding equipment are relatively expensive to manufacture and difficult to operate, and additional steps of demoulding from multiple components and trimming rough edges on the web are required when forming reinforcement webs with these types of conventional molding systems. As a result, alternative methods of assembling these reinforcement webs have been desired and/or developed.

One of these alternative methods for assembling a reinforcement web is shown in International Patent Application Publication No. WO 2016/177375 to Vestas Wind Systems, the original assignee of the present application. In this method of the '375 Publication, a pre-formed web flange in the form of a pultruded component having a T-shaped cross-section is assembled in combination with laminate layers of composite material to form the central reinforcement wall and the flange of a reinforcement web. By defining the flange with a pre-formed T-shaped component, there is no need for separate building of composite layers along sides of a mould, and likewise, there is no need for an additional external mould side wall. Instead, the projecting portion of the pre-formed T-shaped component is interleaved with laminate layers and the entire assembly can then undergo vacuum bag resin injection molding of matrix material and curing by application of heat energy. As stated in the '375 Publication, such an assembly method allows for a simple and inexpensive mould tool to be used and reconfigured for different types of wind turbine blade reinforcement webs.

It has been discovered that the pre-formed web flange, which is generally rigid, can be dislodged from a desired position at certain stages of the reinforcement web assembly process, including but not limited to: during lay-up of laminate layers, during vacuum bag installation, and during resin infusion. If the web flange is dislodged in such a manner, the resulting reinforcement web may not define the shape or structural strength it was designed to have. One potential solution would be to secure the pre-formed web flange with additional external mould side walls, but this would potentially cause similar deficiencies and problems as the conventional designs that this assembly method in the '375 Publication was designed to overcome.

Thus, it would be desirable to secure the web flange in position without necessitating the use of the older, more complex and expensive molding equipment. In this regard, a more reliable method and apparatus for manufacturing a reinforcement web for use with a wind turbine blade is desired, particularly in which the advantages of using a pre-formed web flange and vacuum bag resin infusion molding are fully maintained from the design of the '375 Publication.

SUMMARY

An apparatus and method are described herein for assembly of a reinforcement web to be used in a wind turbine with clamping of a pre-formed flange structure in a correct position during the assembly process, to thereby achieve the objectives set forth above including the avoidance of flange structure dislodgments that can affect the structural reliability or integrity of the reinforcement web, while also maintaining the benefits associated with use of simple and inexpensive molding equipment and tools. The locating clamp is easy to assemble and disassemble and is designed for use without substantially impacting the vacuum bag resin injection molding typically performed to consolidate and finalize the reinforcement web as a unitary part.

In one embodiment, a method of assembling a reinforcement web for use with a wind turbine blade is provided. The method includes arranging one or more first laminate layers on a primary surface of a mould. The primary surface terminates at a shoulder portion of the mould, which defines a mould end surface transverse to the primary surface. The method also includes arranging a flange structure, which includes a flange portion and a projecting portion oriented transverse to the flange portion, onto the mould with the projecting portion located on top of a portion of the first laminate layers and the flange portion extending along the mould end surface. After the flange structure is arranged, the flange structure is clamped in position with a locating clamp that includes first and second clamp blocks. The clamping includes moving the first clamp block into removable engagement with the second clamp block, which is fixedly coupled to the mould end surface, so as to push a clamping surface of the first clamp block against the flange portion to hold the flange structure in position on the mould end surface. Finally, the first laminate layers and the flange structure are integrated by vacuum bag resin injection molding of matrix material and curing to bond the projecting portion of the flange structure to the first laminate layers and thereby form the reinforcement web. The clamping of the flange structure during the resin injection molding and consolidation/curing steps assures that the flange structure remains in the correct position without necessitating the use of more complex and expensive molding equipment, such as those conventional moulds with additional exterior side walls.

In one aspect, clamping the flange structure in position further includes engaging a first abutment surface on the first clamp block with a second abutment surface on the second clamp bock. The first and second abutment surfaces are each oblique to the mould end surface, and therefore, the engaging of these first and second abutment surfaces forms an interlocked geometry preventing movement of the first clamp block in a direction transverse to the primary surface of the mould (e.g., upward towards the flange structure). The interlocked geometry prevents movement along at least one axis of movement, which means that the method can further include sliding the first and second clamp blocks along the first and second abutment surfaces in a direction parallel to the primary surface of the mould to removably engage or disengage the first and second clamp blocks relative to each other. The interlocked geometry can also prevent movement in two directions when the first and second abutment surfaces are formed so as to be oblique to the mould end surface in two directions, e.g., laterally and vertically. The edges of the first and second abutment surfaces may be rounded with radii of curvature to assist with engagement and disengagement movements of the first and second clamp blocks. The locating clamp is disassembled after integrating the first and second laminate layers and the flange structure to form the reinforcement web.

In another aspect in accordance with the invention, the first clamp block defines a wedge-shaped bottom end portion. The clamping of the flange structure in position then further includes engaging the first clamp block with the second clamp block to cause the wedge-shaped bottom end portion of the first clamp block to force the clamping surface towards the flange portion of the flange structure. In some embodiments, clamping the flange structure in position includes aligning the first and second clamp blocks with one another to form a unitary three-dimensional shaped body defining an external profile configured to closely engage a vacuum bag. As a result, the formation of resin voids and bridging is avoided during the vacuum bag resin injection molding of matrix material to integrate the elements of the reinforcement web together. In one particular example, the aligning of the first and second clamp blocks results in the formation of a truncated pyramid-shaped body with the first and second clamp blocks, the truncated pyramid-shaped body defining tapered edges along an entire periphery of the locating clamp.

In yet another aspect, the first clamp block includes a locating surface configured to be positioned proximate the mould end surface. Clamping the flange structure in position then further includes positioning the locating surface of the first clamp block adjacent to an end edge of the flange portion of the flange structure to accurately locate the flange structure relative to the mould end surface and relative to the primary surface. The method also includes fixedly coupling the second clamp block with the mould at the mould end surface using a fastener engaged with the second clamp block and the mould. This fastener may be a threaded fastener, for example. Each of these various aspects and features can be combined in any variation of the method in accordance with the principles of this invention.

In another embodiment in accordance with the invention disclosed herein, an apparatus is provided for assembling a reinforcement web for use with a wind turbine blade. The apparatus includes a mould with a primary surface configured to receive first laminate layers defining a central reinforcement wall of the reinforcement web. The primary surface of the mould terminates at a shoulder portion that defines a mould end surface transverse to the primary surface. The mould may be configured to apply heat energy as well. The apparatus also includes at least one locating clamp positioned along the mould end surface. The locating clamp includes a first clamp block having a first abutment surface and a clamping surface, and a second clamp block fixedly coupled to the mould at the mould end surface. The first clamp block is removably engaged at the first abutment surface with a second abutment surface of the second clamp block, which is configured to cause the first clamp block to push the clamping surface against a flange structure including a projecting portion and a flange portion. The projecting portion extends along the primary surface of the mould and the flange portion extends along the mould end surface, so the clamping surface engages with the flange portion of the flange structure. This clamping action holds the flange structure in position during resin injection molding and curing of the reinforcement web. As set forth above, the clamping of the flange structure during the resin injection molding and consolidation/curing steps advantageously assures that the flange structure remains in the correct position without necessitating the use of more complex and expensive molding equipment.

In one aspect of the invention, the first and second abutment surfaces are oblique to the mould end surface, which creates an interlocked geometry that prevents movement of the first clamp block in a direction transverse to the primary surface of the mould when the first and second clamp blocks are engaged with one another. The interlocked geometry prevents movement only along this one axis of movement. As a result, the first and second clamp blocks can be engaged and/or disengaged from one another by sliding movement along the first and second abutment surfaces in a direction parallel to the primary surface of the mould. The first clamp block may define a wedge-like bottom end portion that is configured to force the clamping surface towards the flange portion of the flange structure when engaged with a wedge-shaped reception cavity defined by the second clamp block.

In another aspect, the first and second clamp blocks are formed from and/or coated with a low surface energy material such as PTFE, which is configured to avoid sticking to matrix material during resin injection molding. Likewise, when the first and second clamp blocks are removably engaged and aligned with one another, the locating clamp defines a unitary three-dimensional shaped body with an external profile configured to closely engage a vacuum bag and thereby avoid resin voids or resin bridging during vacuum bag resin injection molding. For example, the locating clamp may define a truncated pyramid-shaped body with tapered edges along an entire periphery of the locating clamp. As set forth above, the use of the locating clamp allows for the reinforcement web to be manufactured with high reliability and consistency, while still using a mould that includes no additional mould side wall or other complex molding equipment and tools.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention.

FIG. 4 is a top perspective view of one embodiment of an apparatus for assembling a reinforcement web, the apparatus including a mould and at least one locating clamp positioned along a mould end surface;

DETAILED DESCRIPTION

Figure 1:
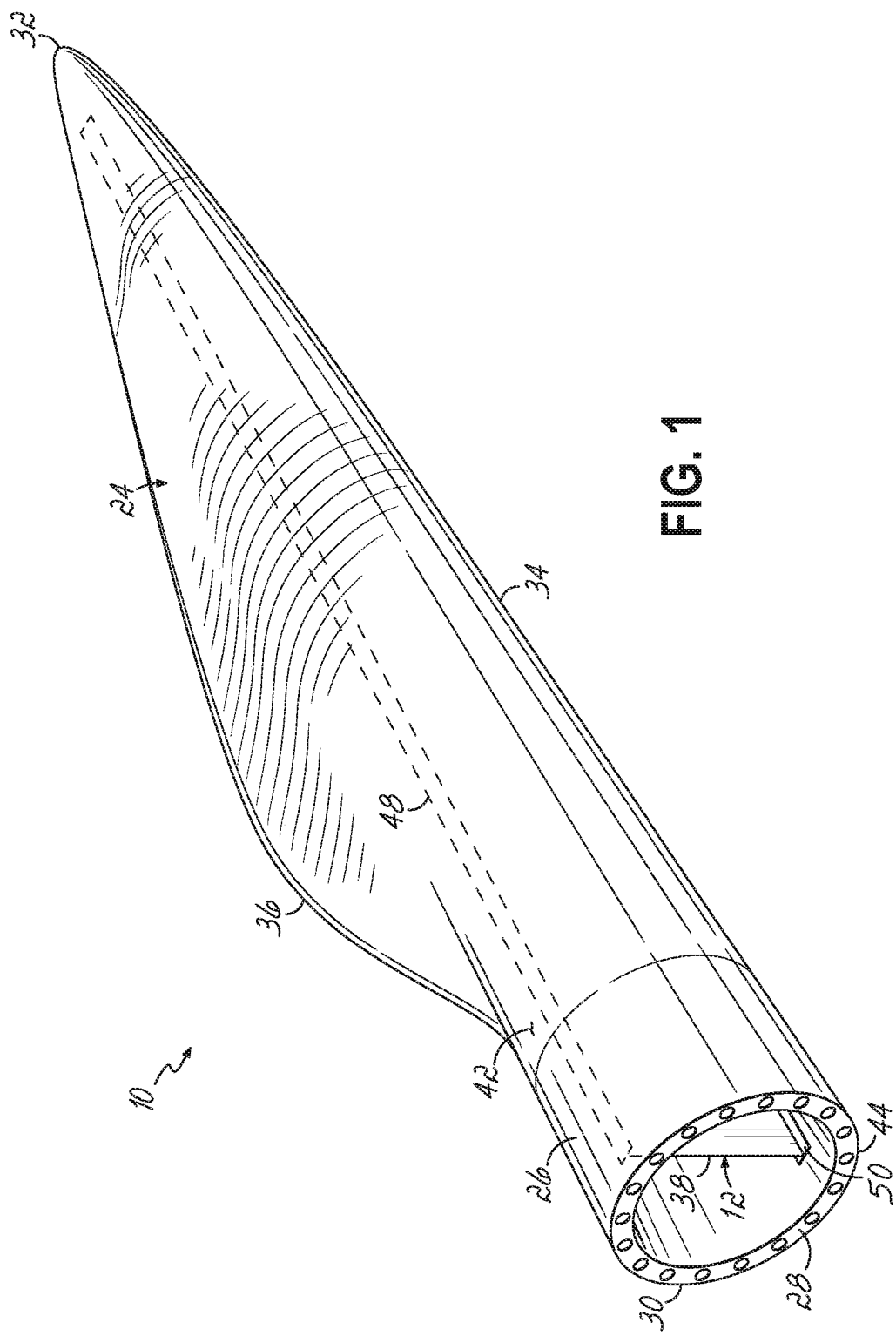
FIG. 1 is a top perspective view of one embodiment of a wind turbine blade with an internal reinforcement web, which may be produced using the method and apparatus for assembling a reinforcement web in accordance with the invention.

With reference to FIGS. 1 through 9, one exemplary embodiment of a wind turbine blade 10 having at least one internal reinforcement web 12, as well as a method and apparatus 14 (see FIGS. 4 through 9) for assembling the reinforcement web 12 are shown in detail, in accordance with the principles of the invention. Advantageously, the apparatus 14 includes at least one locating clamp 16 configured to hold a pre-formed flange structure 20 of the reinforcement web 12 in position relative to a mould 18 during assembly and integration of these elements. The locating clamp 16 is designed for easy installation and removal, while also avoiding any resin collection problems that could otherwise occur when additional elements are located within a vacuum bag for a resin injection molding operation. The assembly of the reinforcement web 12 therefore avoids the potential for any dislodging of the pre-formed flange structure 20 relative to the mould 18 and/or relative to other elements of the reinforcement web 12 during the assembly process. Accordingly, the reinforcement web 12 produced by the method and apparatus described herein is more reliable in structure and strength, without necessitating use of expensive and complex molding equipment.

Figure 2:
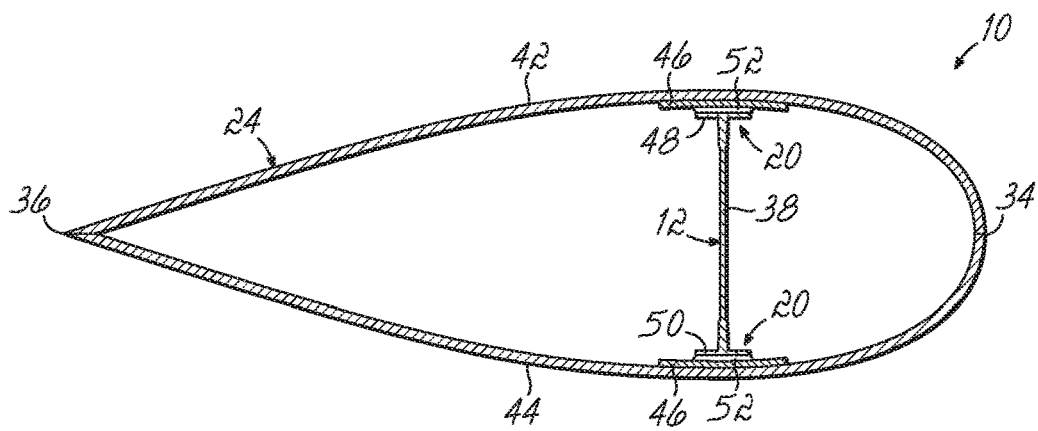
FIG. 2 is a cross-sectional front view through a central portion of the wind turbine blade of FIG. 1, including the reinforcement web.
Figure 3:
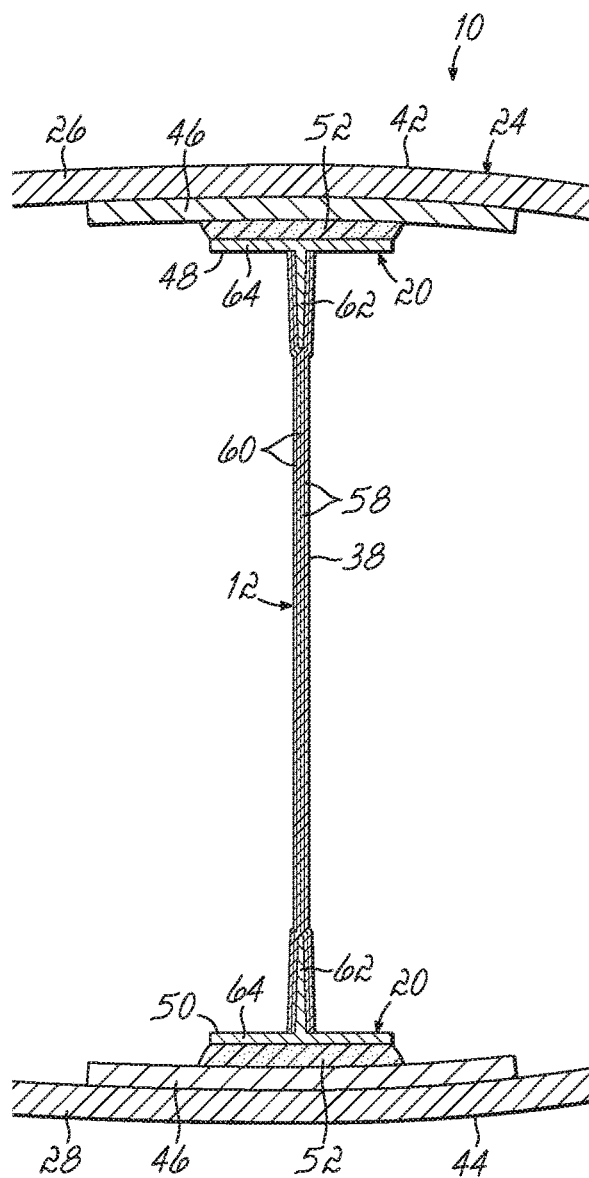
FIG. 3 is a detail view of the reinforcement web of FIG. 2, in position after installation at the wind turbine blade, and showing additional elements of the reinforcement web when constructed in accordance with the invention described herein.

With reference to FIGS. 1 through 3, a wind turbine blade 10 is shown, which is assembled by the apparatus and method of the invention described in further detail below. In this regard, the wind turbine blade 10 includes an outer shell 24 defining the outermost aerodynamic profile of the blade 10, which is shown in FIG. 1 as a fully cured, unitary piece. The outer shell 24 is typically formed by adhesive bonding together a first outer shell portion 26 and a second outer shell portion 28, these being visible in the cross section of FIG. 2 and FIG. 3, for example. The outer shell 24 is primarily formed from a fiber composite material in this embodiment. When fully assembled as shown in these Figures, the outer shell 24 extends between a root end 30 to be connected to a rotor hub (not shown) of a wind turbine and a tip end 32 opposite the root end 30, thereby defining a longitudinal span length of the blade 10. The outer shell 24 also defines a leading edge 34 and a trailing edge 36 of the blade 10, each extending between the root end 30 and the tip end 32. The first and second outer shell portions 26, 28 are typically manufactured to be bonded together along these leading and trailing edges 34, 36, but other assembly configurations are possible in other embodiments of the wind turbine blade 10.

To increase the strength and rigidity of the blade 10, the reinforcement web 12 is bonded with the first and second outer shell portions 26, 28 during assembly of the blade 10. As shown by phantom lines in FIG. 1, in this embodiment of the wind turbine blade 10, the internal web 12 does not extend along a full amount of the longitudinal span length defined between the root end 30 and the tip end 32. However, it is believed to be advantageous to increase the structural rigidity and stiffness at least proximate the root end 30 of the blade 10 and along 50% or more of the longitudinal span length. Accordingly, the internal web 12 extends along a majority of the length of the wind turbine blade 10.

It will be understood that the internal web 12 may be a unitary piece along the entire length thereof or may be assembled from several segments positioned in a line to form the entire length of the internal web 12 without departing from the scope of the invention. For example, the cross-sectional profile of the outer shell 24 changes and flattens out along the length of the blade 10, so the internal web 12 also may need to adjust in size and configuration for different portions along the length of the blade 10. In the '375 Publication discussed in the Background section above, reinforcement webs are shown with linear central reinforcement walls and kinked central reinforcement walls depending on where in the interior of the wind turbine blade 10 the reinforcement web 12 is to be placed (flanges on the opposing ends of the reinforcement webs should be aligned with the portions of the outer shell 24 they are bonded to). However, for the sake of simplicity in description of the invention of this application, the reinforcement web 12 is shown generally in a center of the wind turbine blade 10, which enables the central reinforcement wall 38 of the web 12 to be formed as a generally planar, vertically extending piece. The method of manufacture is not significantly altered in other embodiments with angled or kinked central reinforcement walls.

With continued reference to FIGS. 2 and 3, the reinforcement web 12 generally extends between a windward side 42 and a leeward side 44 of the wind turbine blade 10, each also defined by the outer shell 24. Thus, the reinforcement web 12 provides additional strength and resistance to varying loads encountered by moving through wind when the blade 10 is in operation at a wind turbine. The outer shell 24 of this embodiment is also provided with optional internal girders 46 projecting along the longitudinal span length on the interior of the first and second outer shell portions 26, 28. The internal girders 46 may be formed from a fiber composite or metallic material, with the internal girders 46 placed at locations where the one or more reinforcement webs 12 will be connected to the first and second outer shell portions 26, 28. The internal girders 46 are also used to reinforce the structure of the outer shell 24, as well understood in the art of wind turbines. Thus, in the embodiment shown in these Figures, a top flange 48 and a bottom flange 50 of the reinforcement web 12 are connected or bonded directly to these internal girders 46, such as with an adhesive material 52, shown schematically. Nevertheless, it will be appreciated that the internal girders 46 may be omitted in other embodiments consistent with the invention, in which case the reinforcement web 12 would be bonded directly to the first and second outer shell portions 26, 28.

Although the reinforcement web 12 when fully assembled is generally of a unitary construction held together by a cured resin or matrix material (such unitary construction is shown in FIG. 2, for example), the separate components brought together in the unitary construction in accordance with the method of assembly described below are shown beginning at FIG. 3. To this end, the reinforcement web 12 is assembled from one or more first laminate layers 58 of fiber composite material, one or more second laminate layers 60 of fiber composite material, and two pre-formed flange structures 20. The first and second laminate layers 58, 60 help form the central reinforcement wall 38 of the finished reinforcement web 12, and these may be so-called "pre-preg" glass fiber fabrics pre-impregnated with a resin or matrix material. The pre-formed flange structures 20 define a T-shaped cross section in this embodiment and may be provided by pultrusion of unidirectional glass reinforcing fibers embedded in a resin or matrix material. The flange structures 20 include a projecting portion 62 engaging with the first and second laminate layers 58, 60 to form the central reinforcement wall 38, and also include a flange portion 64 generally perpendicular to the projecting portion 62 so as to define the top flange 48 or the bottom flange 50 of the reinforcement web 12. The assembly and integration of these elements will now be described below with regards to one embodiment of a method of assembly in accordance with the invention.

It will be appreciated that while only one internal reinforcement web 12 in the form of an I-shaped shear web is shown in FIGS. 1 through 3, more than one structural reinforcement or web may be assembled with the outer shell 24 in accordance with other embodiments of a wind turbine blade 10 within the scope of this invention. Likewise, the specific shapes of the flange structures 20 and the types of materials (e.g., pre-pregs and pultrusions) used for the elements assembled into the reinforcement web 12 may be modified in other embodiments consistent with the invention. The example shown is simplified for clarity, and so that focus can be on the advantageous use of locating clamp(s) 16 in the apparatus 14 and method of assembly of the reinforcement web 12. As set forth in further detail below, the locating clamp 16 avoids any dislodgment of the flange structure 20 during assembly of the reinforcement web 12, thereby avoiding structural integrity loss and other problems that can result from such a dislodgment.

Now turning with reference to FIGS. 4 through 9, an apparatus 14 and a series of steps (specifically at FIGS. 5A through 5F) are shown for a method of assembly for the reinforcement web 12 to be used with wind turbine blades 10, according to one embodiment of the invention. In the embodiment shown in FIG. 4, the apparatus 14 includes the mould 18 and a plurality of locating clamps 16 as previously described. The mould 18 includes a primary surface 70 extending along a longitudinal direction. The primary surface 70 is shaped to define the contour of the central reinforcement wall 38 of the web 12 being assembled. As such, in the illustrated embodiment, the primary surface 70 is generally planar and horizontal to define a generally planar central reinforcement wall 38 as shown in the example of FIGS. 1 through 3. The primary surface 70 can have multiple angled portions when it is desired to have kinks or angling in the central reinforcement wall 38. The primary surface 70 terminates at first and second longitudinal edges 72, and the mould 18 includes shoulder portions 74 extending downwardly from each of the longitudinal edges 72 to define opposing free ends of the mould 18.

Each of the shoulder portions 74 of the mould 18 includes a mould end surface 76 that is transverse to the primary surface 70. The mould end surface 76 is shown as generally perpendicular to the primary surface 70 in the illustrated embodiment, but the relative angling of these surfaces may be modified in other embodiments (e.g., where a flange on the reinforcement web will not be perpendicular to the central reinforcement wall 38). The shoulder portions 74 in this illustrated embodiment also include foot portions 78 that extend outwardly from the mould end surfaces 76 and may be used to support the mould 18 on a floor surface, but the specific structural arrangement of the shoulder portions 74 may be modified to omit such foot portions 78 in other embodiments. Likewise, although a shoulder portion 74 is shown along both of the first and second longitudinal edges 72 in FIG. 4, it will be understood that the shoulder portion 74 may only be required on one side of the mould 18 in other embodiments.

Although the first and second longitudinal edges 72 extend in what appears to be a generally parallel manner in FIG. 4, it will be understood that these first and second longitudinal edges 72 often converge towards one another along the longitudinal length of the mould 18 because the height of the interior of the wind turbine blade 10 and the corresponding height of the reinforcement web 12 varies and becomes shorter towards the tip end 32 of the blade 10. To this end, the specific shape and size of the primary surface 70 is tailored to match the desired shape and size of the reinforcement web 12 being assembled, and these variations do not change the method of assembly of the web 12 as described herein.

The locating clamps 16 are located along the mould end surface 76 as shown. Although locating clamps 16 are shown in FIG. 4 along only one of the shoulder portions 74, it will be understood that locating clamps 16 may also be provided on the opposite side at the other shoulder portion 74 as well, particularly when flanges are constructed on both sides of a reinforcement web 12 during the assembly process. Additionally, two locating clamps 16 are shown at different locations along the longitudinal length of the mould 18 in FIG. 4, but it will be understood that only one such locating clamp 16 or more than two may be provided in other embodiments without departing from the scope of this invention. The description below will focus on only one of the locating clamps 16, but it will be understood that clamp-related steps are easily repeated in embodiments with more than one locating clamp 16. The locating clamp 16 advantageously includes a first clamp block 80 and a second clamp block 82, with the first clamp block 80 being removably engaged with the second clamp block 82. As described in further detail below with reference to FIGS. 6 through 9, the first and second clamp blocks 80, 82 enable easy assembly and disassembly of the locating clamp 16 to hold the flange structure 20 in position, while also collectively defining a unitary three-dimensional shaped body that is easy for the vacuum bag to lay over without capturing extra resin during a vacuum bag resin injection molding step of the assembly.

It will be understood that the mould 18 is typically formed from a metallic material such as steel, enabling molding and demoulding steps as set forth below. The mould 18 of the apparatus 14 is a relatively low cost and simple piece of equipment in this embodiment for a number of reasons, including the omission of any need for additional exterior mould side walls. Furthermore, because there are no additional mould side walls interacting with the mould 18 along the mould end surfaces 76, the lay up process for positioning materials and components in the correct locations for integration and assembly is simplified and does not suffer from the various disadvantages of the conventional designs with such mould side walls described in the Background section of this application.

Figure 5A:
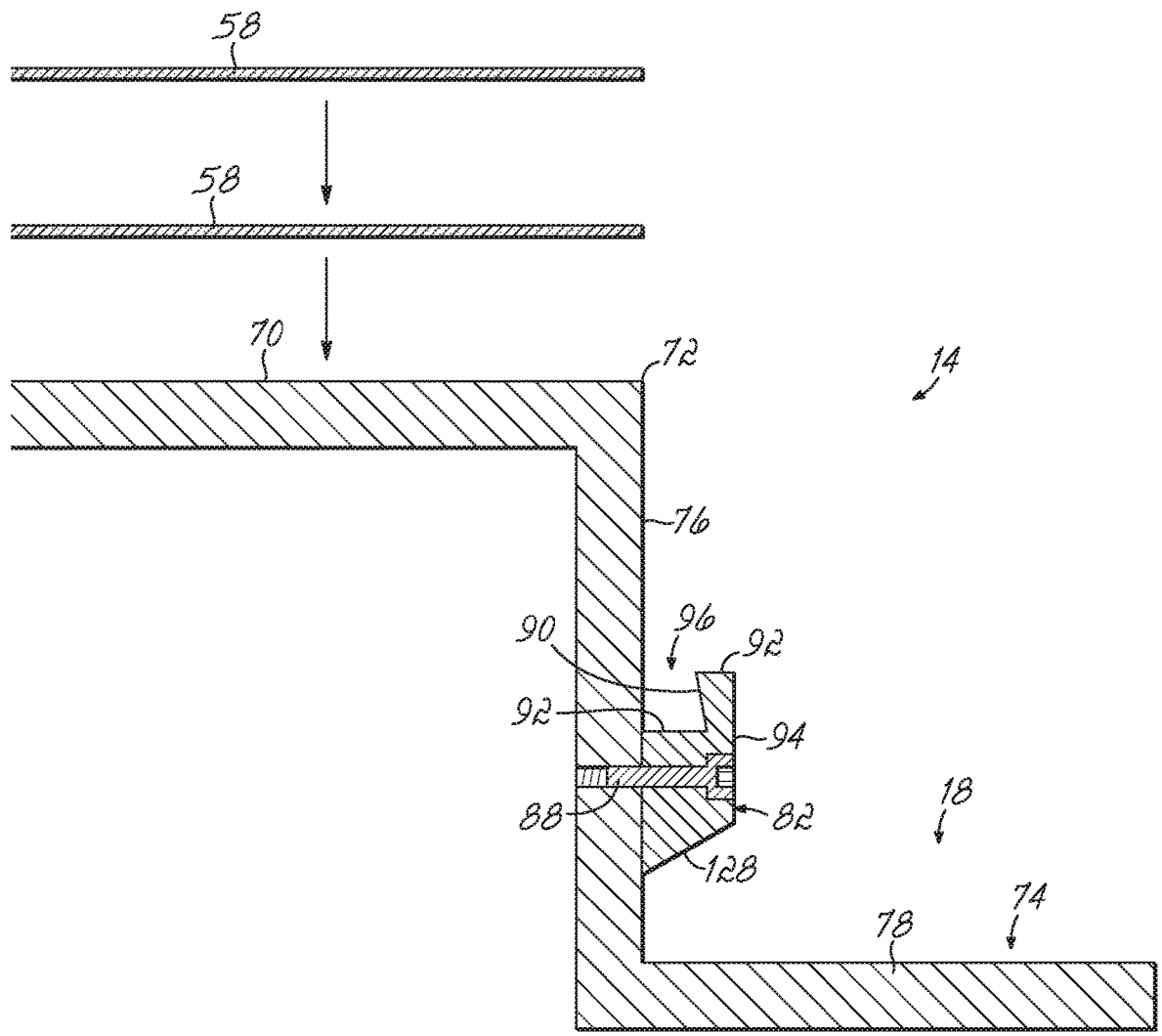
FIG. 5A is a front cross-sectional view of the apparatus of FIG. 4, with this view illustrating a first step of a method of assembly in which first laminate layers of fiber composite material have been laid onto a primary surface of the mould.

Now turning with reference to FIGS. 5A through 5F, various steps of the method of assembly for the reinforcement web 12 are shown using the exemplary embodiment of the apparatus 14 previously described. Only one side of the mould 18 is shown in these Figures, as the process steps would be identical for assembling a flange on a reinforcement web 12 along the other side of the mould 18. Beginning with FIG. 5A, the method begins with a step of arranging one or more of the first laminate layers 58 onto the primary surface 70 of the mould 18. The first laminate layers 58 are defined in this embodiment by layers of glass fiber fabric pre-impregnated with resin (pre-pregs) as set forth above, but other types of composite materials can be used as understood in the composites construction art. When using pre-pregs, the uncured or partially cured resin in the first laminate layers 58 tends to be sticky and this helps maintain the position of the first laminate layers 58 on the primary surface 70 without any discontinuities or wrinkles. As shown in FIG. 5A, the first laminate layers 58 in this embodiment do not extend over and beyond the longitudinal edge 72 because these first laminate layers 58 are used to form a portion of the central reinforcement wall 38 rather than the top flange 48 of the web 12.

Also visible in the view of FIG. 5A, in this initial step of the method of assembly for a reinforcement web 12, the locating clamp 16 is disassembled and only the second clamp block 82 is in position along the mould end surface 76. The cross sections taken in FIGS. 5A through 5F are through a center of one of the locating clamps 16 in order to clarify the structure and functionality of those elements. For example, in FIG. 5A it can be seen that the second clamp block 82 is fixedly coupled in position on the mould end surface 76 by a threaded fastener 88 that extends through the second clamp block 82 and into the mould 18. It will be understood that other types of fasteners or coupling elements may be used in other non-illustrated embodiments to retain the second clamp block 82 in the desired position. Furthermore, the second clamp block 82 can be repositioned by securing the threaded fastener 88 at a different position on the mould end surface 76, such as when the mould 18 is reconfigured to form reinforcement webs 12 having top flanges 48 or larger or smaller sizes. For the purposes of this invention, the second clamp block 82 is only shown in this one fixed position and configuration.

Several other features of the second clamp block 82 are visible in FIG. 5A. To this end, the second clamp block 82 includes a second abutment surface 90 spaced apart from and facing towards the mould end surface 76 when the second clamp block 82 is fixedly coupled with the mould 18. The second abutment surface 90 is oblique relative to the mould end surface 76. To this end, the second abutment surface 90 is oblique in one direction relative to the mould end surface 76 (angled in the vertical plane) in this embodiment, but it will be understood that this oblique arrangement may be along one or two or more different directions in other embodiments, an example of which is shown and described below with reference to FIGS. 10 through 12. The second clamp block 82 also includes upper locating surfaces 92 extending generally horizontally between one end of the second abutment surface 90 and the mould end surface 76, and also between the other end of the second abutment surface 90 and an outermost face 94 of the second clamp block 82. The outermost face 94 is oriented away from the mould 18. The mould end surface 76, one of the upper locating surfaces 92, and the second abutment surface 90 collectively define a wedge-shaped reception cavity 96 configured to receive a corresponding portion of the first clamp block 80, as set forth below.

Figure 5B:
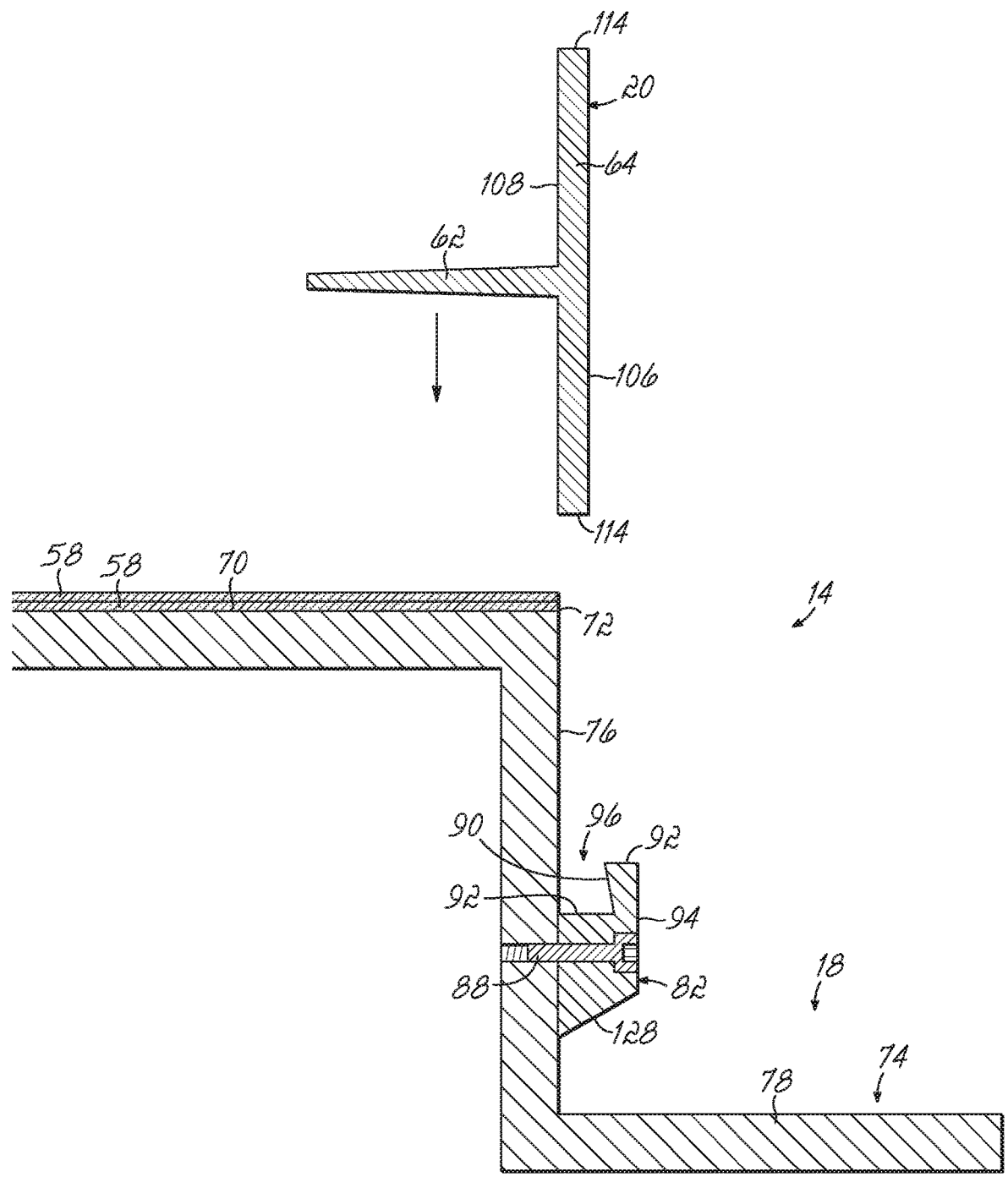
FIG. 5B is a front cross-sectional view of the apparatus of FIG. 5A, showing a further step of the method of assembly in which a pre-formed flange structure is positioned on the mould so as to have a projecting portion laying at least partially on the first laminate layers at the primary surface of the mould, and so as to have a flange portion extending along a mould end surface.

Turning to FIG. 5B, a further step of the method of assembly for the reinforcement web 12 is shown in accordance with this embodiment. In this step, the pre-formed flange structure 20 is arranged onto the mould 18. More specifically, the flange structure 20 is T-shaped in cross section with the projecting portion 62 (also referred to in some contexts as the "upstand") extending along a portion of the primary surface 70 of the mould 18 and the flange portion 64 extending transverse to the primary surface 70 and along the mould end surface 76. Once again, when prepregs are used for the first laminate layers 58, the stickiness of the resin therein may help initially hold the projecting portion 62 of the flange structure 20 in position on top of the first laminate layers 58. However, such stickiness, when present, is not sufficient to avoid potential dislodgments that can occur when the flange structure 20 is inadvertently contacted during other steps of the method of assembly. Nevertheless, this embodiment of the invention addresses that possible issue by clamping the flange structure 20 in position as set forth below.

As initially described above, the pre-formed flange structure 20 of this embodiment is comprised of a plurality of unidirectional glass reinforcing fibers embedded in a cured resin matrix. The specific cross-sectional shape of the flange structure 20, in this case T-shaped, is provided by pultrusion, e.g., coating the unidirectional fibers in resin or matrix material and then drawing them through a T-shaped die. The pultrusion die can be differently shaped to form other cross-sectional shapes of the flange structure 20 in other non-illustrated embodiments (L-shaped, etc.) without departing from the scope of the invention. Likewise, the solid, generally rigid flange structure 20 could also be formed using different construction techniques known in the composites art.

Figure 5C:
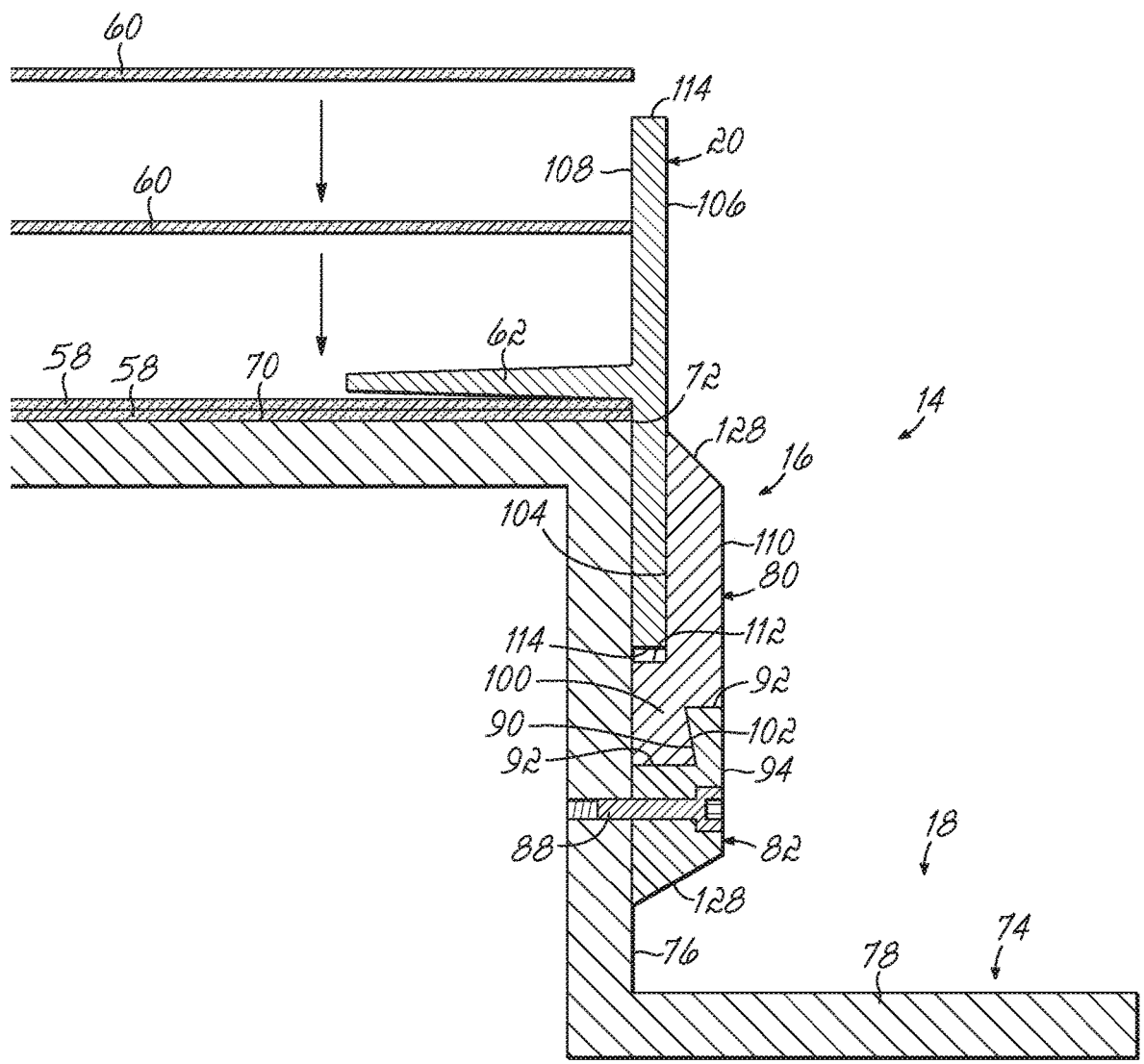
FIG. 5C is a front cross-sectional view of the apparatus of FIG. 5B, showing a further step of the method of assembly in which a first clamp block is engaged with a second clamp block to form the locating clamp shown in FIG. 4, thereby securing the flange structure in position on the mould end surface, and this view also showing lay up of second laminate layers of fiber composite material onto the primary surface of the mould.

Now with reference to FIG. 5C, the method of assembly for the reinforcement web 12 continues with a step of clamping the flange structure 20 in position at the mould 18. To perform this clamping, the first clamp block 80 of the locating clamp 16 is removably engaged with the second clamp block 82 as shown in the engaged position in FIG. 5C. The first clamp block 80 includes a wedge-shaped bottom end portion 100, which is configured to be inserted into the wedge-shaped reception cavity 96 at the top of the second clamp block 82 to form an interlocked geometry of the first and second clamp blocks 80, 82. As shown more clearly in FIGS. 6 and 7, which are described in further detail below, the wedge-shaped cavity 96 extends along the longitudinal direction of the mould 18 and as such, the wedge-shaped bottom end portion 100 may be slid in this longitudinal direction parallel to the primary surface 70 of the mould 18 (see the movement arrow in FIG. 6) to insert the wedge-shaped bottom end portion 100 into the wedge-shaped cavity 96. The wedge-shaped bottom end portion 100 includes a first abutment surface 102 facing away from the mould end surface 76 and oriented oblique to this mould end surface 76. As set forth above, this oblique arrangement can be along one direction or two directions in various embodiments consistent with the scope of this disclosure.

The interlocked geometry formed by the first and second clamp blocks 80, 82 is specifically caused, at least in part, by engagement of the first and second abutment surfaces 102, 90 with one another. In this illustrated embodiment, the oblique orientation or angling of these first and second abutment surfaces 102, 90 causes the wedge-shaped bottom end portion 100 and the wedge-shaped reception cavity 96 to be larger at a bottom than at a top. Consequently, the larger bottom of the bottom end portion 100 is prevented from moving upwardly (in the context of FIG. 5C) through the smaller top of the reception cavity 96. Thus, the interlocked geometry of the first and second clamp blocks 80, 82 prevents movement of the first clamp block 80 in a direction transverse to the primary surface of the mould 18, e.g., in a direction upwardly or away from the second clamp block 82. The interlocked geometry only prevents movement along this one axis though, leaving the ability to slide the first and second clamp blocks 80, 82 in another direction to engage or disengage them. The bottom of the first clamp block 80 (including the wedge-shaped bottom end portion 100) is also configured to sit atop the upper locating surfaces 92 defined by the second clamp block 82, to thereby accurately position the first clamp block 80 at an appropriate height to engage with the flange structure 20.

The first and second abutment surfaces 102, 90 are also formed in such a manner to push or force the first clamp block 80 inwardly towards the flange structure 20. In this regard, even though the bottom of the first clamp block 80 and the top of the second clamp block 82 are designed to be complementary in shape to avoid forming significant gaps or voids at the locating clamp 16, the wedge shape defined by the first clamp block 80 is designed to push the first clamp block 80 inwardly towards the mould end surface 76. The first clamp block 80 further includes a clamping surface 104 located adjacent a top of the first clamp block 80 and facing inwardly towards the mould 18 when the locating clamp 16 is assembled. The clamping surface 104 is forced by the wedge shape to apply a clamping force to the flange structure 20 at the flange portion 64. More particularly, the flange portion 64 includes an outer side 106 facing away from the projecting portion 62, and this outer side 106 is what is engaged by the clamping surface 104 of the first clamp block 80. This clamping force presses part of an underside 108 of the flange portion 64 (the underside 108 facing towards the projecting portion 62) into greater frictional engagement with the mould end surface 76. This clamping of the locating clamp 16 in the position shown in FIG. 5C advantageously prevents undesirable dislodging of the flange structure 20 during the following steps of the method of assembly for the reinforcement web 12.

As shown in FIG. 5C, the clamping surface 104 of the first clamp block 80 extends between an outermost face 110 of the first clamp block 80 and a locating surface 112 that faces generally upwardly in the installed position of the locating clamp 16 shown in this Figure. The locating surface 112 is designed to be positioned adjacent to an end edge 114 of the flange portion 64, which is between the outer side 106 and the underside 108 of the flange portion 64. To this end, the locating surface 112 assures that the flange structure 20 has been accurately located relative to the mould end surface 76 and relative to the primary surface 70 of the mould 18. The locating surface 112 can therefore identify any issues that have occurred from inaccurate placement or a previous dislodgment of the flange structure 20 prior to clamping. In one embodiment, the locating surface 112 is designed with about 1 millimeter of clearance relative to the end edge 114 so as to enable easy assembly of the locating clamp 16 (e.g., there is a clearance fit, not an interference fit). It will be understood that the locating surface 112 may be repositioned in other embodiments.

FIG. 5C also shows a further step of the method of assembly for the reinforcement web 12 according to this embodiment, typically performed after clamping the flange structure 20 in position against the mould end surface 76. In this regard, the method continues with arranging one or more of the second laminate layers 60 onto the primary surface 70 of the mould 18, specifically on top of the first laminate layers 58 and the projecting portion 62 of the flange structure 20. The projecting portion 62 is effectively sandwiched between the first and second laminate layers 58, 60 in this arrangement. The second laminate layers 60 are defined in this embodiment by the same pre-pregs as the first laminate layers 58, but other types of composite materials can be used as understood in the composites construction art.

With the second laminate layers 60 laid up in position, the components defining the central reinforcement wall 38 and the reinforcement web 12 are fully assembled and ready for integration together.

It will be understood in other, non-illustrated embodiments in accordance with this invention, foam cores and other internal shaping elements can also be optionally added between the first and second laminate layers 58, 60 as desired for different profiles of the reinforcement web 12, but such additional elements are not shown for the sake of simplicity of this example. Likewise, in other embodiments of the methods in accordance with this invention, the second laminate layers 60 may be omitted from the assembly making the reinforcement web 12. In those embodiments, the projecting portion 62 is integrated with the first laminate layers 58 along only one side thereof, but this construction remains structurally sufficient for use in some wind turbine blades. Regardless of whether the second laminate layers 60 are included or not in an embodiment of this invention, the remaining steps of the method of assembly for the reinforcement web 12 remain the same as described in detail above and below.

Figure 5D:
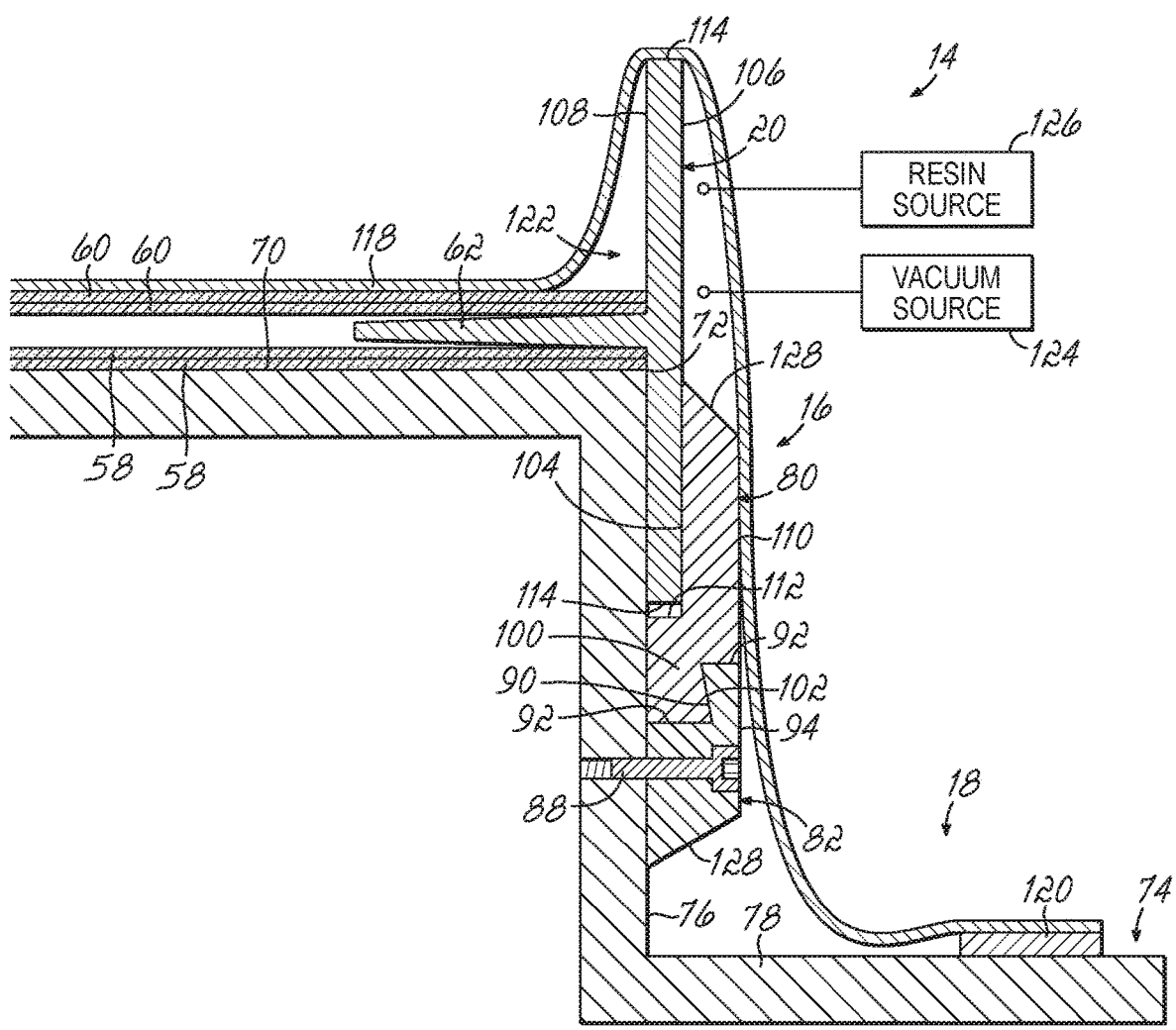
FIG. 5D is a front cross-sectional view of the apparatus of FIG. 5C, showing a further step of the method of assembly in which a vacuum bag has been placed over the assembled elements of the reinforcement web, and a resin source and vacuum source are used to conduct vacuum bag resin injection molding to assemble the aforementioned elements with matrix material (curing heat may also be applied at this stage)

This next step of the method of assembly for the reinforcement web 12 is shown in FIG. 5D. More specifically, the first and second laminate layers 58, 60 and the flange structure 20 are integrated into a unitary piece by applying vacuum bag resin injection molding and by curing these elements together using resin or matrix material. This step of the method is performed in one embodiment as follows. The assembly of components on the mould 18 is covered with a vacuum bag 118 or film, which is sealed against the mould 18 using sealing tape 120 or a similar connector. The vacuum bag 118 and mould 18 collectively enclose a sealed region 122 as shown in FIG. 5D. Other optional layers such as transfer mesh and release layers may also be provided with the vacuum bag 118, although those elements are not shown in the illustrated embodiment for simplicity.

Air is removed from the sealed region 122 using a vacuum source 124, which may be a vacuum pump or a similar device. At the same time, additional resin material is injected into the sealed region 122 using a resin source 126, which again is schematically shown in FIG. 5D but may include a conventional pump. The removal of air and injection of resin or a matrix material causes the vacuum bag 118 to compress onto the components of the reinforcement web 12 and consolidate those components together. At the same point or shortly thereafter, the resin and/or matrix material is cured to finalize the bonds between the consolidated together components, including the first and second laminate layers 58, 60 (or just the first laminate layers 58 in embodiments omitting the second laminate layers 60) and the flange structure 20. In one example, the mould 18 is configured to apply heat energy to cause curing of the resin, but it will be understood that other external heat sources or just room temperature curing may be used in other embodiments consistent with the scope of the invention.

Figure 5E:
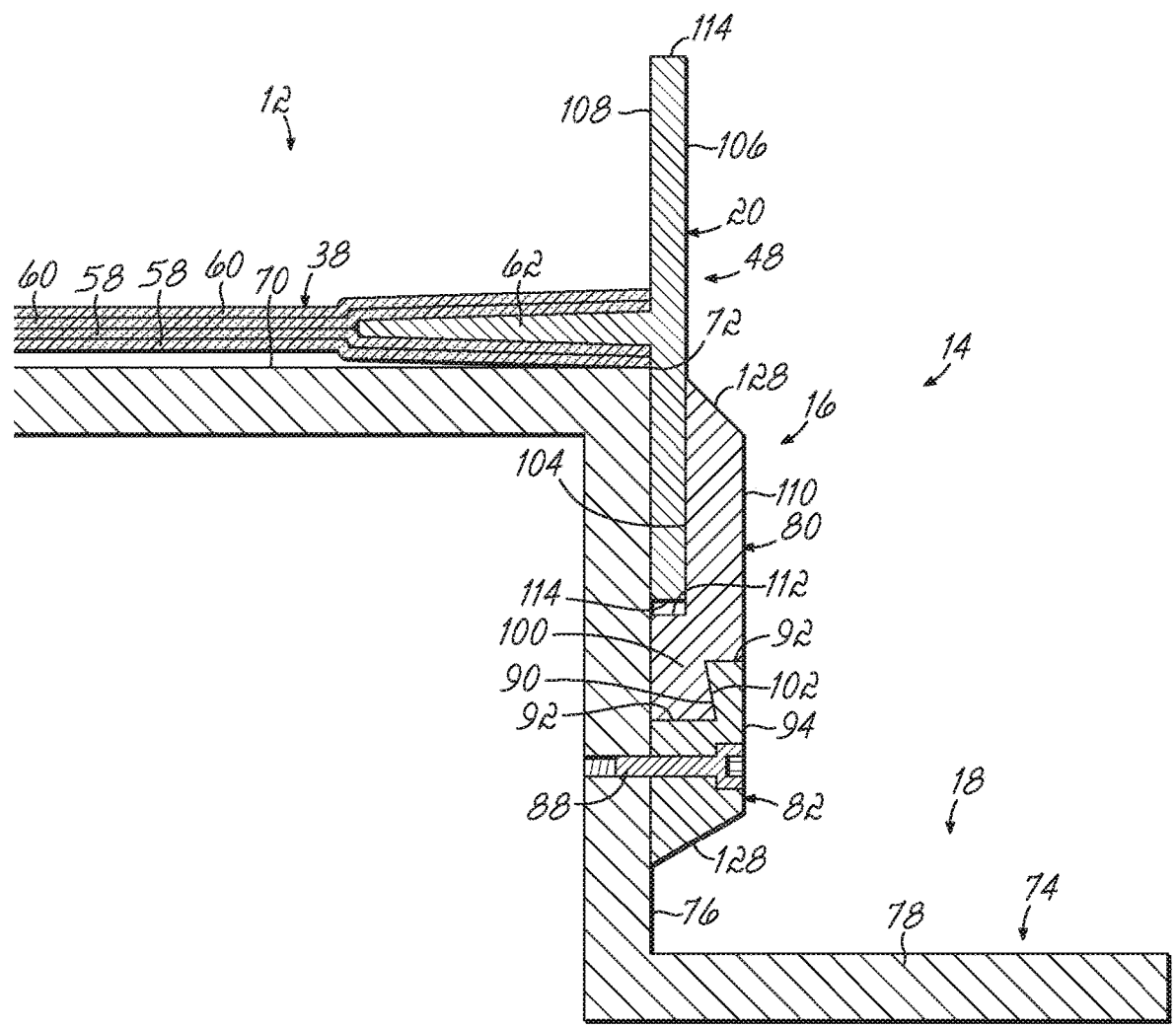
FIG. 5E is a front cross-sectional view of the apparatus of FIG. 5D, showing a further step of the method of assembly in which the vacuum bag has been removed following consolidation and curing of the reinforcement web, and the locating clamp remains in position, holding the flange structure against the mould end surface.

After the resin or matrix material has cured, the vacuum bag 118 can be removed, as shown in the next step of the method of assembly in FIG. 5E. The vacuum bag resin injection molding and the curing has integrated the first and second laminate layers 58, 60 and the flange structure 20 by bonding those elements together into a unitary structure defining the reinforcement web 12. The separate components of the reinforcement web 12 continue to be shown in these latter Figures for consistency, but it will be understood that the reinforcement web 12 is fully integrated together in this state at FIG. 5E. The reinforcement web 12 is then in a state ready for demoulding from the mould 18, as described in further detail below. Although FIGS. 5E and 5F show a portion of the central reinforcement wall 38 separated from the primary surface 70 of the mould 18, it will be understood that this separation may not occur until after a demoulding process step occurs later in the method of assembly (to this end, the illustration in FIGS. 5E and 5F is simply shown to be consistent with the finalized versions of the reinforcement web 12 shown in FIGS. 2 and 3).

Another advantage of the design of the locating clamp 16 is evident at this step of the method of assembly. Although the vacuum bag 118 is shown in a state before the air in the sealed region 122 is largely evacuated in FIG. 5D, it is clear from FIGS. 5D and 5E that the shape and cross-sectional profile defined by the locating clamp 16 presents no sharp corners or apertures that could lead to bridging of the vacuum bag 118 and collection of excess resin or matrix material at those bridges. It will be appreciated that the head of the threaded fastener 88 or the aperture where that fastener resides is typically taped over to prevent resin entry into that portion of the locating clamp 16.

As briefly described above, the first and second clamp blocks 80, 82 are aligned to form a generally unitary three-dimensional shaped body that is capable of closely engaging the vacuum bag 118 in a vacuum assisted resin injection molding process. In the specific embodiment shown (and perhaps more clearly in FIGS. 6 through 9, the outermost faces 110, 94 of the first and second clamp blocks 80, 82 collectively form a truncated pyramid-shaped body as an external profile. The outermost faces 110, 94 include tapered edges 128 along an entire periphery thereof to avoid presenting any sharp contours or corners that could lead to voids or resin bridging. Likewise, as shown in FIGS. 5D and 5E, the first and second clamp blocks 80, 82 closely engage one another and also closely engage the flange structure 20 and the mould end surface 76 on the side opposite the outermost faces 110, 94 when the locating clamp 16 is fully assembled, so there are no regions which would collect resin or matrix material during the integration step of the method of assembly. Therefore, the vacuum bag 118 is easily removed from the locating clamp 16 in this step, and no excess resin build up should be present, which removes any need for cutting away such excess before demoulding.

Figure 5F:
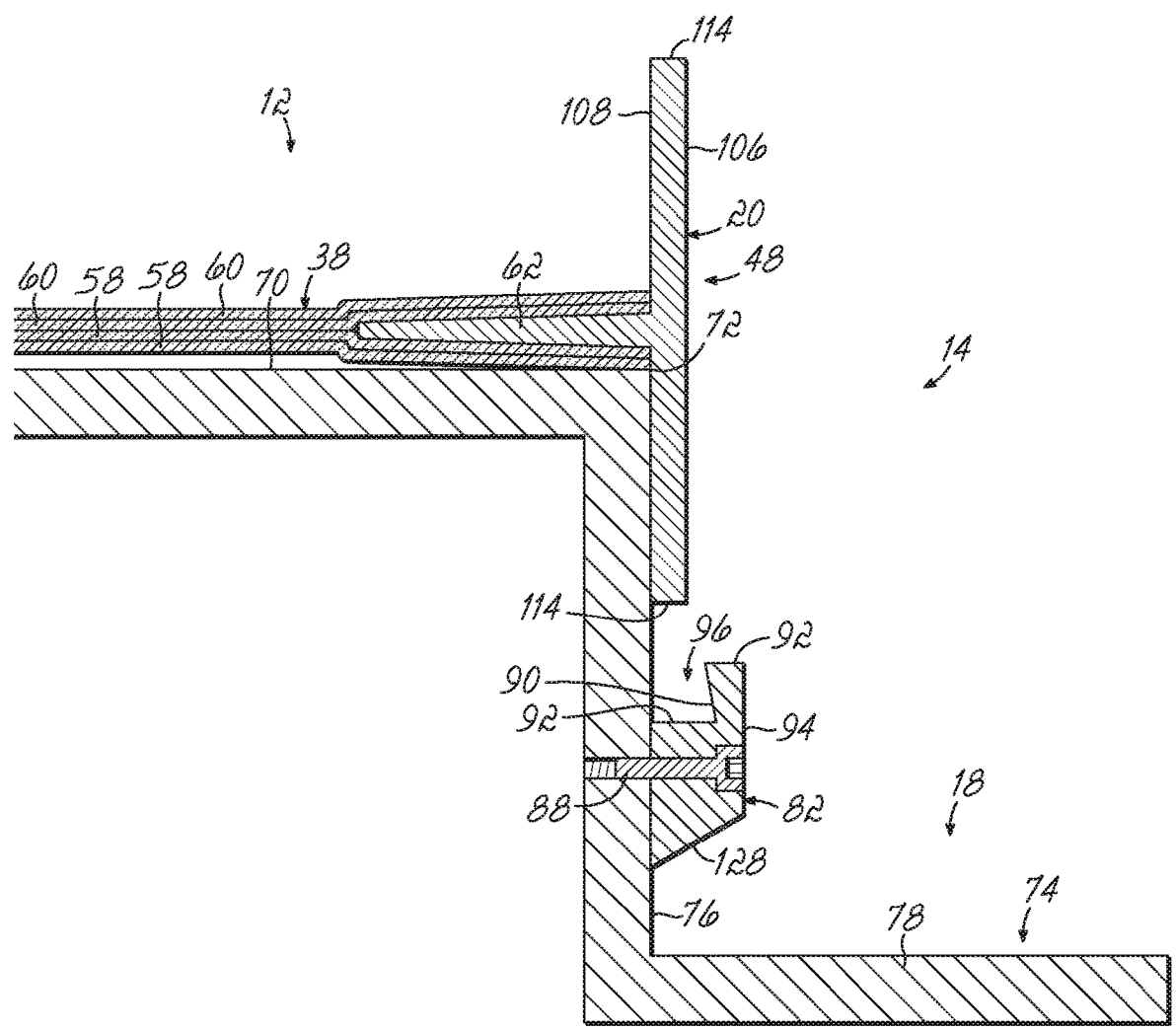
FIG. 5F is a front cross-sectional view of the apparatus of FIG. 5E, showing a further step of the method of assembly in which the first clamp block of the locating clamp is removed from the second clamp block to release the flange of the reinforcement web, leaving the reinforcement web ready for demoulding.
Figure 6:
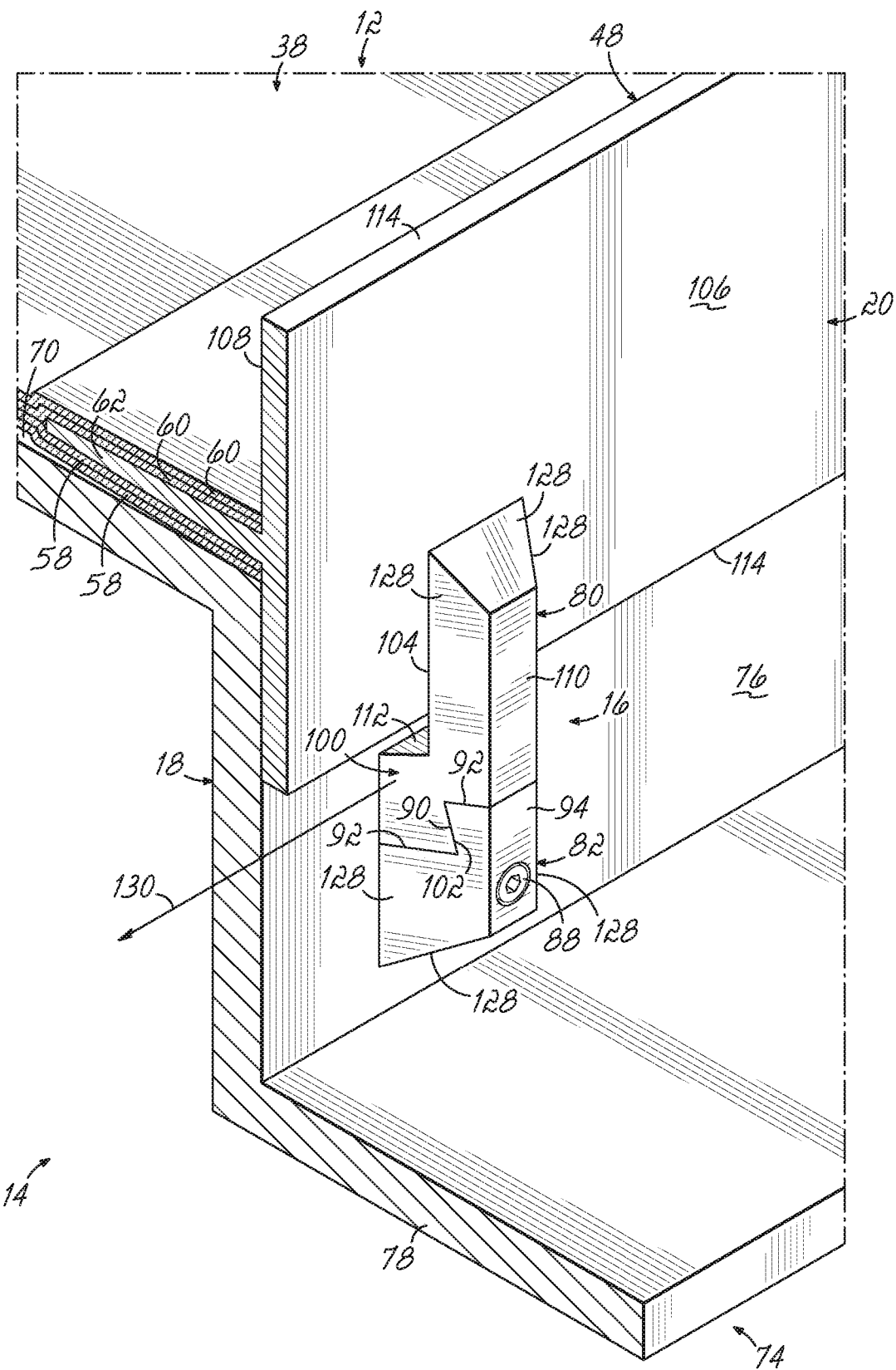
FIG. 6 is a detail perspective view of the apparatus and specifically the locating clamp in the state of the method of assembly shown in FIG. 5E, showing further details of how the first clamp block is removable from the second clamp block.
Figure 7:
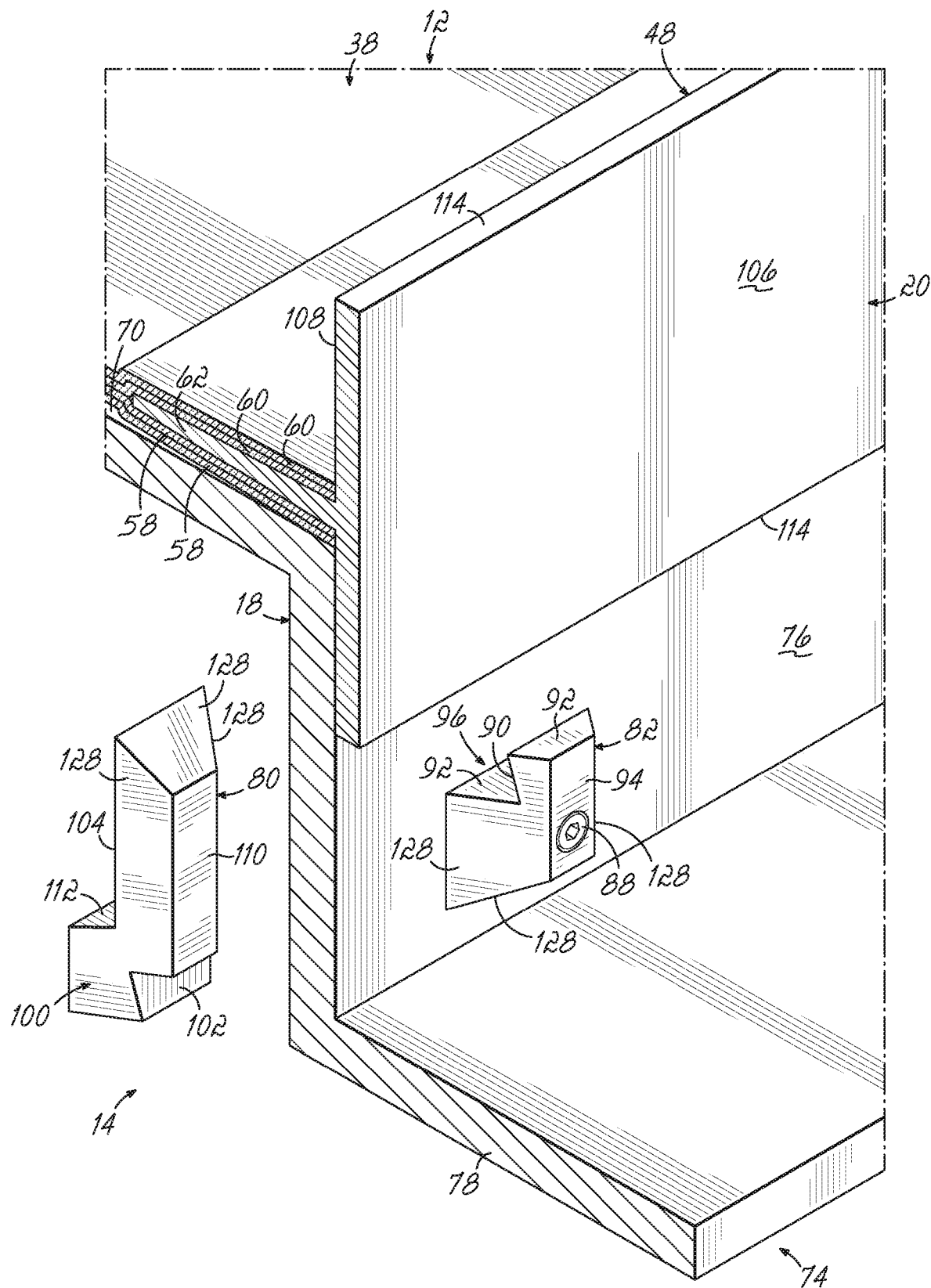
FIG. 7 is a detail perspective view of the apparatus and specifically the locating clamp in the state of the method of assembly shown in FIG. 5F, and also showing further structural details of the first and second clamp blocks.

With reference now to FIG. 5F, as well as the perspective views of FIGS. 6 and 7, a further step of the method of assembly for the reinforcement web 12 is shown. As shown in FIG. 5F, after the vacuum bag 118 is removed, the locating clamp 16 can be disassembled to release the clamping force applied to the flange structure 20, which is now the top flange 48 (or alternatively, the bottom flange 50) of the reinforcement web 12. The disassembly is straightforward and easy as a result of the design of the locating clamp 16. In this regard, the first clamp block 80 is removed by sliding movement in a direction parallel to the primary surface of the mould 18, e.g., the longitudinal direction. Such movement is shown by an arrow 130 in FIG. 6, for example. Because the locating clamp 16 defines an external profile which does not collect resin build up during the assembly process, there should be no need to cut away any cured resin before removing the first clamp block 80 in this manner. Furthermore, the assembly and disassembly of the first and second clamp blocks 80, 82 relative to one another can be performed using tap-in with a conventional hammer or the like, as no other tools should be necessary. Indeed, the first and second clamp blocks 80, 82 may be disengaged using tapping by hand with no tools as well. Following removal of the first clamp block 80 as shown in the state of FIGS. 5F and 7, the reinforcement web 12 is ready for any further demoulding steps, which will be conventional and well understood by those in the composites construction and wind turbine fields.

Figure 8:
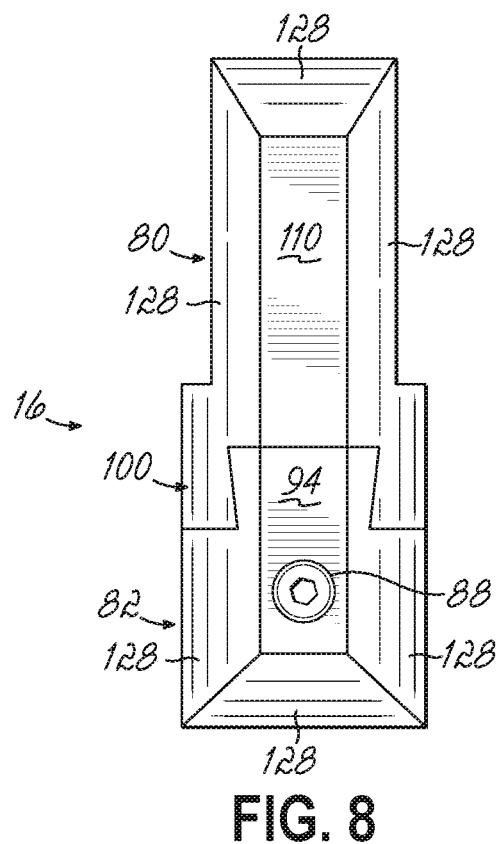
FIG. 8 is an end view of the locating clamp of the apparatus shown in FIGS. 4 through 7, with the first and second clamp blocks engaged to form a unitary three-dimensional shaped body.
Figure 9:
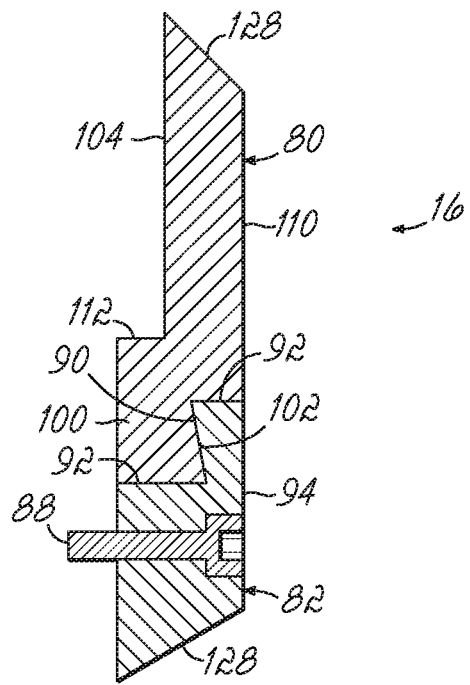
FIG. 9 is a side cross-sectional view of the locating clamp of FIG. 8, showing further structural details of the first and second clamp blocks.

FIGS. 6 through 9 show further details of the locating clamp 16 used with the apparatus 14 and method of assembly for the reinforcement web 12. FIGS. 6, 8 and 9 show the locating clamp 16 in a fully assembled position with the first and second clamp blocks 80, 82 removably engaged with one another, and FIG. 7 shows the first clamp block 80 disengaged and moved laterally away from the second clamp block 82. These views show the various surfaces, faces, and sides of the first and second clamp blocks 80, 82 in different orientations so as to provide a better overall understanding of how these elements of the locating clamp 16 are configured.

For example, FIGS. 6 through 9 show the unitary three-dimensional shaped body formed by the locating clamp 16 when the first and second clamp blocks 80, 82 are engaged with one another. This body takes the shape of a truncated pyramid-shaped body in this embodiment, thereby defining an external profile that presents no sharp corners or transitions which could lead to vacuum bag 118 bridging and resin build up in undesired locations around the locating clamp 16. More specifically, the truncated pyramid-shaped body is oblong in the illustrated embodiment, but it will be understood that other types of unitary solid three-dimensional shaped bodies are possible within the scope of the invention. The outermost faces 110, 94 of the first and second clamp blocks 80, 82 include tapered edges 128 along all four sides of the truncated pyramid-shaped body as most evident in FIG. 8. Thus, when the aperture where the threaded fastener 88 is located is taped over as alluded to above, the entire external profile presented by the outermost faces 110, 94 on the locating clamp 16 is designed to closely engage the vacuum bag 118 and thereby make removal of the vacuum bag 118 easy following the vacuum bag resin injection molding step of the method of assembly. In this regard, the shape and chamfering used on the external profile of the locating clamp 16 advantageously improves molding operations at the apparatus 14 while allowing for clamping of the flange structure 20 in position as shown.

The locating clamp 16 is also formed from materials to assist with this advantageous molding functionality. In the example shown in FIGS. 6 through 9, the entirety of the first and second clamp blocks 80, 82 is formed from a low surface energy material such as plastics, which are configured to avoid sticking to resin or matrix material during resin injection molding under the vacuum bag 118. In this regard, one specific plastics material successfully used for the locating clamp 16 is polytetrafluoroethylene, PTFE. However, it will be appreciated that other similar materials having low surface energy (also referred to as low surface tension) may be used to form the entirety of, or coat the outermost portions of, the first and second clamp blocks 80, 82 in other embodiments of the invention. To this end, regardless of the specific low surface energy material provided at the locating clamp 16, the locating clamp 16 is manufactured so as to avoid sticking to resin or matrix material. That material property, when combined with the external profile presented by the locating clamp 16 as described above, assures that the locating clamp 16 does not collect or clog with resin that would necessitate cutting away before disassembly of the clamp 16 and demoulding of the reinforcement web 12.

As noted above, the other beneficial features of the locating clamp 16 are shown in further detail in FIGS. 6 through 9. The oblique first abutment surface 102 on the first clamp block 80 and the oblique second abutment surface 90 on the second clamp block 82 (oblique relative to mould end surface 76 in one or more directions) slide against one another to allow for easy engagement and disengagement of the first and second clamp blocks 80, 82. The first and second abutment surfaces 102, 90 also help define the wedge-shaped bottom end portion 100 and the wedge-shaped cavity 96, which interact with one another when the first and second clamp blocks 80, 82 are engaged to provide at least two functions: first, these shapes of the first and second clamp blocks 80, 82 are complementary so as to form a substantially unitary three-dimensional shaped body that does not present voids or bridge points for collection of resin; and second, these shapes engage one another to torque or force the clamping surface 104 of the first clamp block 80 inwardly towards the flange structure 20 arranged along the mould end surface 76. Thus, even though the locating clamp 16 is easy to assemble and disassemble as shown by movement arrow 130 in FIG. 6, a reliable clamping force is provided to hold the flange structure 20 in position against undesirable dislodgments during the method of assembly, and this avoids the need for any complex molding equipment such as additional external mould side walls.

When the second clamp block 82 is fixedly engaged with the mould 18 along the mould end surface 76 using the threaded fastener 88, the upper locating surfaces 92 at a top of the second clamp block 82 are positioned to accurately locate the first clamp block 80 for clamping engagement with the flange structure 20. To this end, the second clamp block 82 is designed to help accurately locate both the first clamp block 80 and the flange structure 20, once the first and second clamp blocks 80, 82 are removably engaged. Likewise, the locating surface 112 on the interior of the first clamp block 80 is configured to be adjacent to and/or in close proximity to the end edge 114 of the flange structure 20 to both confirm the accurate positioning of the flange structure 20 and avoid significant gaps or voids on the interior side of the locating clamp 16 where resin could undesirably collect and clog the clamp 16. Thus, similar to how the external profile presented by the outermost faces 110, 94 is configured for effective use in vacuum bag resin injection molding, the internal profile of the locating clamp 16 is shaped to closely engage with the flange structure 20 and the mould end surface 76 for similar reasons.

Consequently, the locating clamp 16 shown in detail in FIGS. 6 through 9 enables the apparatus 14 shown in FIGS. 4 through 7 to perform the method of assembly of a reinforcement web 12 in accordance with this invention. More particularly, the locating clamp 16 is easy to open and close thanks to the interlocking geometry of the first and second clamp blocks 80, 82, it properly positions and retains a pre-formed flange structure 20 (T-shaped, L-shaped, or otherwise) in position for assembly into the reinforcement web 12, and it presents no profiles which add extra work when performing vacuum bag resin injection molding or demoulding of the reinforcement web 12. Therefore, the generally simple and low cost molding equipment without external mould side walls can continue to be used for making the reinforcement web 12, and the potential problems with dislodgment of the pre-formed flange structure 20 during the method of assembly are mitigated or eliminated.

Figure 10:
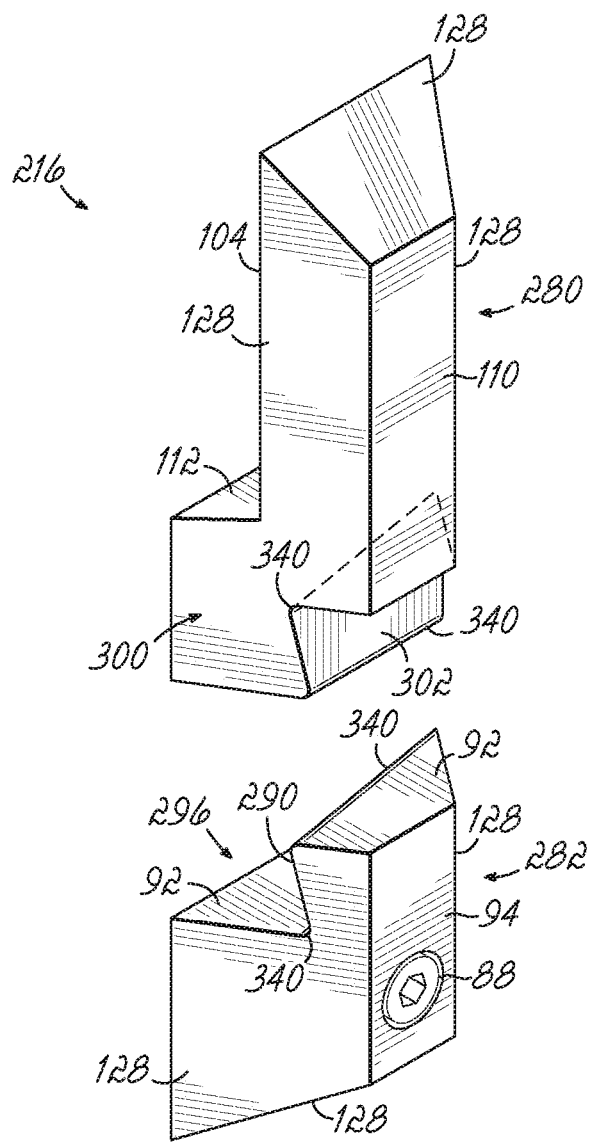
FIG. 10 is a detail perspective view similar to FIG. 7 and showing another embodiment of the locating clamp used with the apparatus and method of assembly in accordance with the invention, and showing first and second clamp blocks disengaged from each other.
Figure 11:
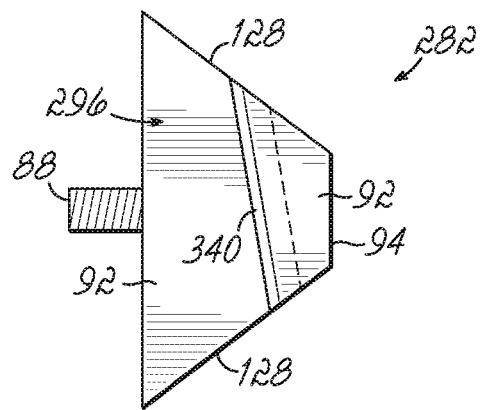
FIG. 11 is a top view of the second clamp block of the locating clamp of FIG. 10, showing additional features of this embodiment.
Figure 12:
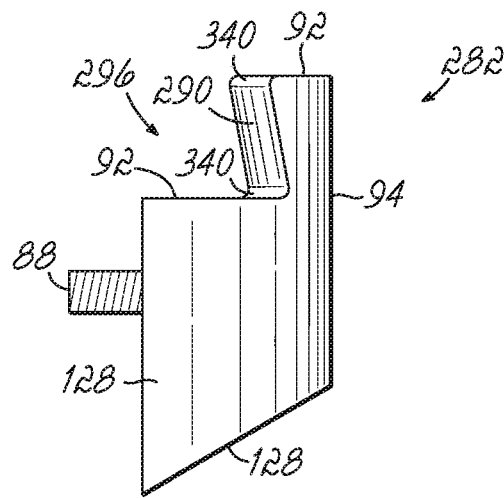
FIG. 12 is a side view of the second clamp block of the locating clamp of FIG. 10, showing additional features of this embodiment.

With reference to FIGS. 10 through 12, another embodiment of the locating clamp 216 is shown for use with the apparatus 14 and method of assembly of a reinforcement web 12 in accordance with this invention. Elements of the locating clamp 216 that are largely unchanged from the prior embodiment are numbered the same in this embodiment, with revised numbers in the "200" or "300" series being used for modified elements described below. The elements with the same numbers as in the embodiment of FIGS. 6 through 9 are not described in detail again here, for the sake of brevity. However, it will be understood that the features shown in this embodiment may be individually or collectively used with those of the prior embodiment, without departing from the scope of the invention.

As initially described briefly above, this embodiment of the locating clamp 216 includes a first clamp block 280 and a second clamp block 282 with corresponding first and second abutment surfaces 302, 290 that are modified so as to be oblique to the mould end surface 76 (not shown in FIG. 10) in two directions rather than just in one direction. As shown most clearly in the top and side views of the second clamp block 282 in FIGS. 11 and 12, the second abutment surface 290 is angled in a horizontal plane such that one lateral end of the wedge-shaped cavity 296 is larger than the other lateral end (e.g., the second abutment surface 290 gets closer to the mould end surface 76 along the lateral length thereof). FIGS. 10 and 12 also show that the second abutment surface 290 is also oblique in a vertical plane (like the previously-described embodiment) such that a top end of the second abutment surface 290 is closer to the mould end surface 76 than a bottom end thereof, which also causes the bottom of the wedge-shaped cavity 296 to be larger than the top of that wedge-shaped cavity 296. As will be readily understood from the phantom lines shown in FIG. 10, the first abutment surface 302 matches the profile of the second abutment surface 290 such that the first abutment surface 302 is also oblique in two directions relative to the mould end surface 76. Accordingly, the wedge-shaped bottom end portion 300 defined by the first clamp block 280 is thicker towards a bottom end thereof and also thicker towards one lateral side as compared to the opposite lateral side. The first and second clamp blocks 280, 282 also include many of the same surfaces and features as the previous embodiment that remain essentially unchanged by the revision to the first and second abutment surfaces 302, 290, including but not limited to: the clamping surface 104, the outermost faces 110, 94, the locating surfaces 92, 112, and the tapered edges 128.

As a result of the first and second abutment surfaces 302, 290 being oblique in two directions relative to the mould end surface 76, the engagement and disengagement of the first and second clamp blocks 280, 282 is made easy to perform by hand without any specialized tools. To this end, the first clamp block 280 is still moved in a direction along the longitudinal length of the mould end surface 76 to engage the bottom end portion 300 into the wedge-shaped cavity 296. However, as a result of the obliqueness of the first and second abutment surfaces 302, 290 along the lateral length of the locating clamp 216, the end of the bottom end portion 300 inserted first into the wedge-shaped cavity 296 is smaller than the cavity 296 at that end. It will be readily understood that this avoids any need for the first and second clamp blocks 280, 282 to be perfectly located relative to one another before moving the bottom end portion 300 into the wedge-shaped cavity 296. As shown in FIG. 12, the various edges and corners of the abutment surfaces 302, 290 and the like may include small radii of curvature 340 along end edges thereof. In particular, the internal line along which the locating surface 92 and the second abutment surface 290 adjoin, may include a radiussed corner. These radiussed edges and corners may help facilitate sliding movement of the bottom end portion 300 into the wedge-shaped cavity 296. It may additionally reduce stress concentrations inherent in sharp edges and internal corners. Such radii of curvature 340 may also be used with other embodiments, such as the locating clamp 16 described in detail above.

The shape and profile of the first and second abutment surfaces 302, 290 in this embodiment then also assist with accurate placement and alignment of the first and second clamp blocks 280, 282 with one another. Following the initial insertion of the smaller lateral end of the bottom end portion 300 into the larger lateral end of the wedge-shaped cavity 296, the first clamp block 280 is further pushed in the same direction, which eventually causes the first and second abutment surfaces 302, 290 to slide into a relatively tight frictional engagement as the smaller lateral end of the bottom end portion 300 reaches the corresponding smaller lateral end of the wedge-shaped cavity 296, these smaller ends being formed to be generally the same size. This frictional engagement also helps force the first clamp block 280 towards closer engagement with the mould end surface 76, including the clamping engagement of clamping surface 104 with the flange structure 20.

The interlocked geometry defined by the engagement of the first and second abutment surfaces 302, 290 in this embodiment blocks further movement of the first clamp block 280 relative to the second clamp block 282 in two directions when these elements of the locating clamp 216 are frictionally engaged and aligned with one another, e.g., the state of FIGS. 6 and 8. In this regard, the first clamp block 280 cannot move upwardly along the mould end surface 76 in a direction transverse to the primary surface 70 of the mould 18, and the first clamp block 280 cannot move further laterally along the longitudinal length of the mould end surface 76 in a direction parallel to the primary surface 70 of the mould 18 (at least in the same direction as the movement used to engage the first and second clamp blocks 280, 282 together). The engagement of the first and second abutment surfaces 302, 290 therefore forms an interlocked geometry that allows for movement of the first clamp block 280 only in a reversed direction from that movement used to engage the first and second clamp blocks 280, 282, which is also in the direction parallel to the primary surface 70 of the mould 18. Once the frictional engagement of the first and second clamp blocks 280, 282 is overcome to begin disengaging these elements, which may be done by hand, the wedge-shapes of the bottom end portion 300 and the cavity 296 make it easy to remove the first clamp block 280 from the second clamp block 282, when the method of assembly described above is completed for the reinforcement web 12. Thus, the radiused edges and the two-direction obliqueness make this embodiment of the locating clamp 216 easy to engage and disengage for clamping of the flange structure 20 in position relative to the mould 18, which provides several advantages as set forth in detail above.

While the present invention has been illustrated by the description of various embodiments thereof, and while the embodiments have been described in considerable detail, it is not intended to restrict or in any way limit the scope of the appended claims to such detail. Thus, the various features discussed herein may be used alone or in any combination, including with any type of single rotor or multi rotor wind turbine. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

What is claimed is:

1. A method of assembling a reinforcement web for use with a wind turbine blade, the method comprising:
    arranging one or more first laminate layers on a primary surface of a mould, the primary surface terminating at a shoulder portion of the mould defining a mould end surface transverse to the primary surface;
    arranging a flange structure, which comprises a flange portion and a projecting portion oriented transverse to the flange portion, onto the mould with the projecting portion overlapping a portion of the first laminate layers and the flange portion extending along the mould end surface;
    integrating the first laminate layers and the flange structure by vacuum bag resin injection molding of matrix material and by curing to bond the projecting portion of the flange structure to the first laminate layers and thereby form the reinforcement web; and
    after arranging the flange structure, clamping the flange structure in position with a locating clamp having first and second clamp blocks and being connected to the mould end surface such that the first and second clamp blocks are each located on the mould end surface, the clamping further including moving the first clamp block into removable engagement with the second clamp block to push a clamping surface of the first clamp block against the flange portion to hold the flange structure in position on the mould end surface.

2. The method of claim 1, wherein clamping the flange structure in position with the locating clamp further comprises:
    engaging a first abutment surface defined on the first clamp block with a second abutment surface on the second clamp block, the first and second abutment surfaces being oblique to the mould end surface, the engaging of the first and second abutment surfaces forming an interlocked geometry preventing movement of the first clamp block in a direction transverse to the primary surface of the mould.

3. The method of claim 2, wherein the interlocked geometry formed by engaging the first and second abutment surfaces prevents movement along at least one axis of movement, and the method further comprises:
    sliding the first and second clamp blocks along the respective first and second abutment surfaces in a direction parallel to the primary surface of the mould, thereby to removably engage the first and second clamp blocks after arranging the flange structure and/or to disengage the first and second clamp blocks from one another after integrating the first laminate layers and the flange structure to form the reinforcement web.

4. The method of claim 2, wherein the first and second abutment surfaces are oblique to the mould end surface in two directions such that the interlocked geometry formed by engaging the first and second abutment surfaces prevents movement along two movement directions.

5. The method of claim 2, wherein the first and second abutment surfaces include curved edges defining radii of curvature.

6. The method of claim 1, wherein the first clamp block defines a wedge-shaped bottom end portion, and clamping the flange structure in position with the locating clamp further comprises:
    engaging the first clamp block with the second clamp block to cause the wedge-shaped bottom end portion of the first clamp block to force the clamping surface towards the flange portion of the flange structure.

7. The method of claim 1, wherein clamping the flange structure in position with the locating clamp further comprises:
aligning the first and second clamp blocks with one another to form a unitary three-dimensional shaped body defining an external profile configured to closely engage a vacuum bag to thereby avoid resin voids or bridging during vacuum bag resin injection molding of matrix material.

8. The method of claim 7, wherein aligning the first and second clamp blocks with one another further comprises:
forming a truncated pyramid-shaped body with the first and second clamp blocks to thereby define the external profile, the truncated pyramid-shaped body defining tapered edges along an entire periphery of the locating clamp.

9. The method of claim 1, wherein the first clamp block includes a locating surface configured to be positioned proximate the mould end surface, and clamping the flange structure in position with the locating clamp further comprises:
positioning the locating surface of the first clamp block adjacent to an end edge of the flange portion of the flange structure.

10. The method of claim 1, further comprising:
fixedly coupling the second clamp block with the mould at the mould end surface using a fastener engaged with the second clamp block and the mould.

11. The method of claim 1, further comprising:
arranging one or more second laminate layers on top of the first laminate layers and the projecting portion of the flange structure,
wherein clamping the flange structure in position with the locating clamp occurs before arranging the second laminate layers, and the step of integrating further comprises:
integrating the first and second laminate layers and the flange structure by vacuum bag resin injection molding of matrix material and by curing to bond the projecting portion of the flange structure between the first and second laminate layers.

12. The method of claim 1, further comprising forming and/or coating the first and second clamp blocks of the locating clamp with a low surface energy material configured to avoid sticking to matrix material during resin injection molding.

\* \* \* \* \*